United States Patent [19]
Karaki et al.

[11] Patent Number: 6,128,885
[45] Date of Patent: Oct. 10, 2000

[54] METHOD OF AND SYSTEM FOR PRODUCING AND PACKAGING FILM

[75] Inventors: Hideyuki Karaki; Chiaki Suzuki, both of Minamiashigara; Yoshinobu Misumi, Odawara; Takayuki Kambara, Minamiashigara; Susumu Sato, Odawara, all of Japan

[73] Assignee: Fuji Photo Film Co., Ltd., Kanagawa-Ken, Japan

[21] Appl. No.: 09/482,315

[22] Filed: Jan. 14, 2000

Related U.S. Application Data

[62] Division of application No. 09/140,800, Aug. 26, 1998, Pat. No. 6,044,623.

[30] Foreign Application Priority Data

| Aug. 27, 1997 | [JP] | Japan | 9-231200 |
| Aug. 27, 1997 | [JP] | Japan | 9-231203 |
| Aug. 27, 1997 | [JP] | Japan | 9-231227 |
| Sep. 30, 1997 | [JP] | Japan | 9-266948 |

[51] Int. Cl.$^7$ ............................................. B65B 63/04
[52] U.S. Cl. .............................. 53/430; 53/53; 53/118; 209/659; 209/660; 209/680; 29/710; 29/806
[58] Field of Search .................. 73/865.8; 700/110, 700/112; 209/576, 577, 578, 597, 659, 660, 675, 677, 679, 680; 53/53, 54, 117, 118, 119, 430, 456, 563, 67; 29/407.01, 407.04, 407.05, 705, 710, 806, 722, 773

[56] References Cited

U.S. PATENT DOCUMENTS

| 2,541,517 | 2/1951 | Jecusco . |
| 2,738,066 | 5/1956 | Gueffrox . |
| 2,776,094 | 1/1957 | Edwards et al. . |
| 2,940,232 | 6/1960 | Walllace et al. . |
| 2,991,880 | 7/1961 | Steele et al. . |
| 3,457,627 | 7/1969 | Napor et al. . |
| 3,645,396 | 2/1972 | Reiss . |
| 3,748,715 | 7/1973 | Hoover et al. . |
| 3,749,242 | 7/1973 | Eckstein . |
| 3,802,051 | 4/1974 | Andler et al. . |
| 3,802,052 | 4/1974 | Andler et al. . |
| 3,954,181 | 5/1976 | Fries . |
| 4,100,667 | 7/1978 | Napor et al. . |
| 4,172,526 | 10/1979 | Moser . |
| 4,651,880 | 3/1987 | Mabboux et al. . |
| 4,693,376 | 9/1987 | Marion et al. . |
| 4,924,419 | 5/1990 | McIntyre et al. . |
| 4,947,536 | 8/1990 | Suzuki et al. . |
| 5,052,562 | 10/1991 | Petho . |
| 5,119,549 | 6/1992 | Foote et al. . |
| 5,479,691 | 1/1996 | Shimizu et al. . |
| 5,647,113 | 7/1997 | Hase et al. . |

FOREIGN PATENT DOCUMENTS

| 4-217511 | 8/1992 | Japan . |
| 6-266059 | 9/1994 | Japan . |
| 2506165 | 4/1996 | Japan . |

*Primary Examiner*—Daniel B. Moon
*Attorney, Agent, or Firm*—Sughrue, Mion, Zinn, Macpeak & Seas, PLLC

[57] ABSTRACT

A process for producing packaged products from a film roll includes the steps of detecting whether an elongate film is defective or not, detecting whether a spool is defective or not, detecting whether an assembled cartridge is defective or not, and detecting whether a case is defective or not. Various defective products detected in these steps are removed without being fed to subsequent steps. By thus detecting various defects in the process for producing packaged products from a film roll, high-quality packaged products can efficiently be manufactured.

7 Claims, 33 Drawing Sheets

F I G. 9
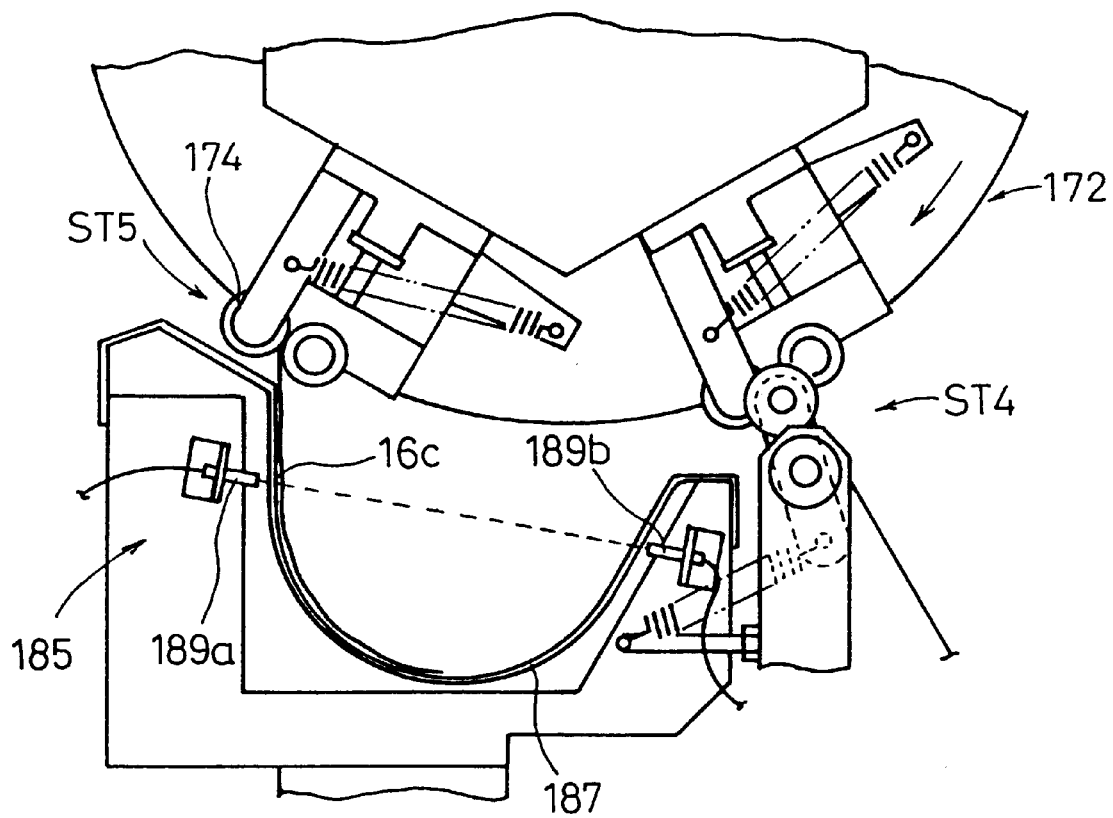

F I G.13
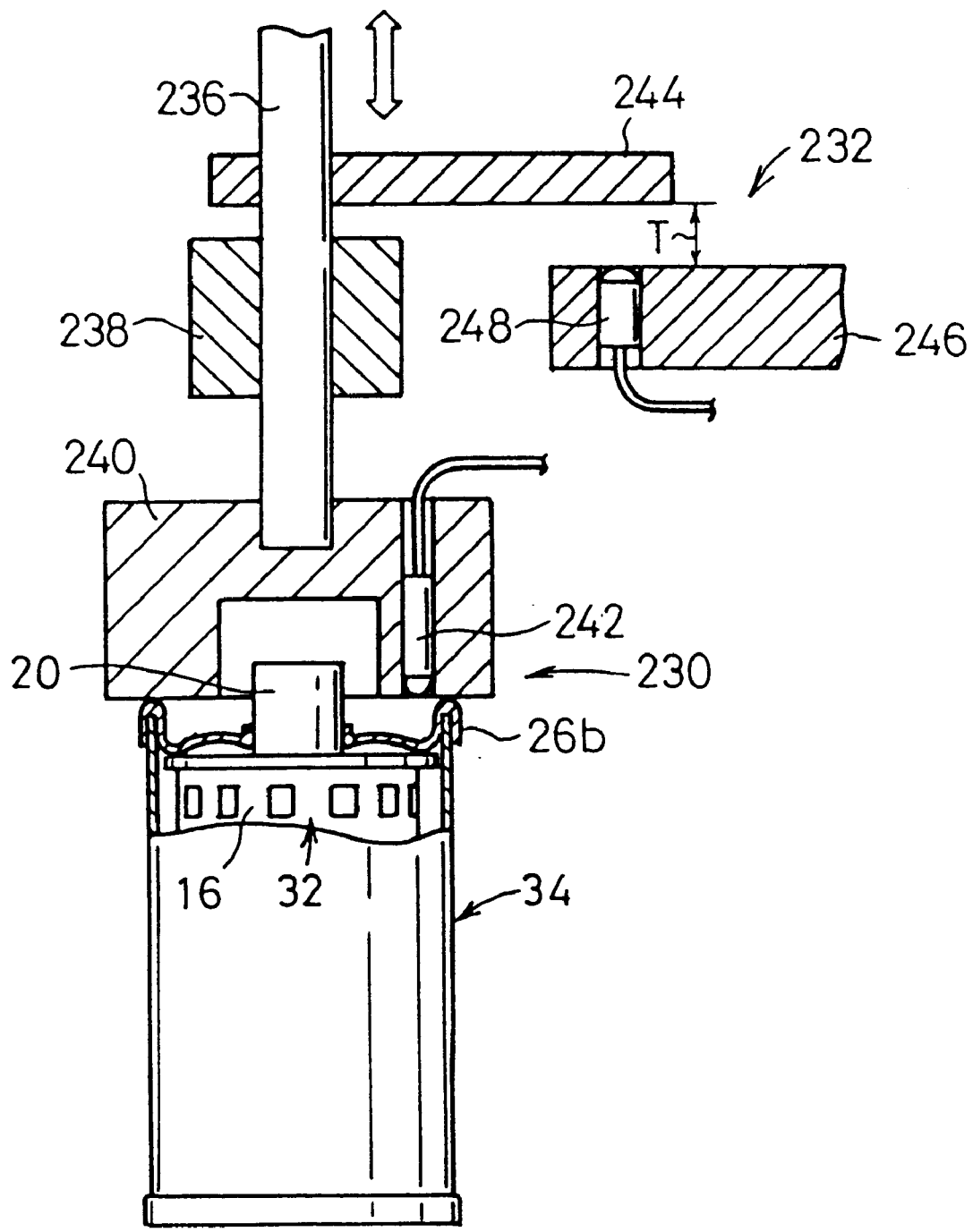

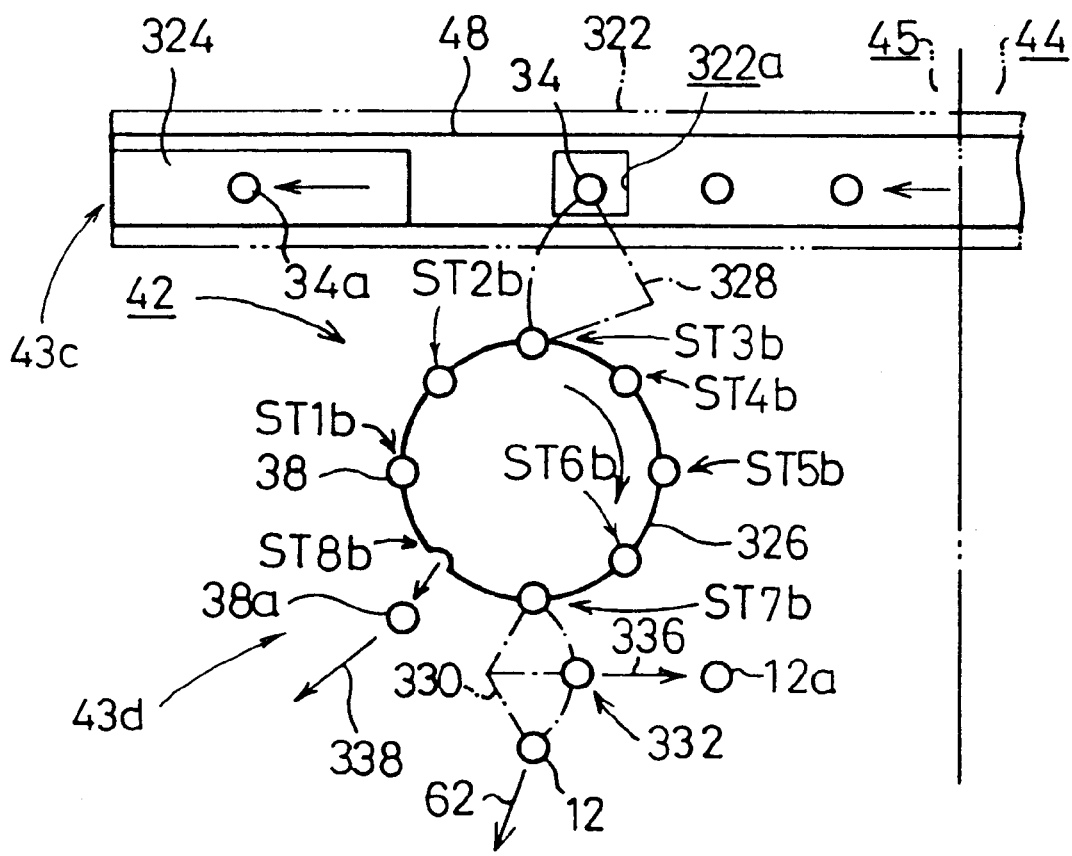
F I G.15

METHOD OF AND SYSTEM FOR
PRODUCING AND PACKAGING FILM

This is a divisional of application Ser. No. 09/140,800 filed Aug. 26, 1998, now U.S. Pat. No. 6,044,623 the disclosure of which is incorporated herein by reference.

BACKGROUND OF THE INVENTION

1. Field of the Invention

The present invention relates to a method of and a system for winding a film of given length, cut from a film roll, winding the film on a spool, placing the wound film into a film cartridge, and inserting the film cartridge into a case, thereby to manufacture a packaged product.

2. Description of the Related Art

For producing and packaging a photographic photosensitive film, it has been customary to perform various steps including the steps of producing a film of given length, winding the film, placing the wound film into a film cartridge, and inserting the film cartridge into a case.

These various steps are carried out by a station comprising a film supply unit for unwinding a film roll and cutting the unwound film to a film of given length, a film coiling unit for coiling the film of given length on a spool thereby to produce a film coil, a cartridge producing unit for staking a cap on an end of a tubular cartridge blank sheet thereby to produce a cartridge with one open end, an assembling unit for inserting the film coil into the cartridge and staking another cap on the open end of the cartridge thereby to produce an assembled cartridge, and an encasing unit for placing the assembled cartridge into a case and attaching a case cap on an open end of the case thereby to produce a packaged product.

As described above, the various steps are carried out by the above station in order to manufacture packaged products from a film roll. However, the station effects no defect inspection in each of the manufacturing steps. If something defective is produced in any one of the steps, it is delivered successively through the subsequent steps, resulting in an increased ratio of defective packaged products. Consequently, it is not possible to carry out an efficient process of manufacturing packaged products, and high-quality packaged products cannot be manufactured efficiently.

According to one solution disclosed in Japanese laid-open patent publication No. 6-266059, photosensitive film magazines are successively supplied from a photosensitive film magazine assembling unit through a predetermined path covered with a light shield tunnel that extends over a distance required to place the photosensitive film magazine assembling unit essentially in a dark room condition. The supplied photosensitive film magazines are inspected one by one in a non-dark room condition, and then supplied successively through a given path to a container storing unit. In the container storing unit, only those photosensitive film magazines which are judged as accepted by the inspection process are stored in a photosensitive film magazine container.

In the above disclosed process, since photosensitive film magazines are inspected in a non-dark room condition, if something defective occurs prior to the production of a cartridge in the cartridge producing unit, e.g., if a defective film coil is produced by the film coiling unit in a dark room, it is not possible to inspect the defective film coil.

When the defective film coil is introduced into the cartridge producing unit, operation of the cartridge producing unit may be interrupted because the defective film coil may not be inserted into a cartridge, or if the defective film coil is inserted into a cartridge, then a ratio of defective assembled cartridges is increased. Since the cartridges are considerably expensive, the production of many defective assembled cartridges is uneconomical because they are usually thrown away.

The film coiling unit includes a spool supply unit which contains a predetermined number of spools. After the spools are successively discharged from the spool supply unit, new spools are automatically supplied to the film coiling unit by a feeder such as a conveyor or the like.

Spools are made of synthetic resin, and have thin-walled large-diameter tubular members on opposite axial ends thereof. Inasmuch as a thin-walled large-diameter tubular member tends to be cracked or broken with ease, a spool with a defective large-diameter tubular member may be delivered to the film coiling unit. When a film of given length is wound on such a spool with a defective large-diameter tubular member, a defective film coil is produced. Accordingly, the yield of accepted packaged products cannot be increased, and an efficient and economical process of producing and packaging films cannot be carried out.

A case for accommodating an assembled cartridge therein is usually in the form of a bottomed cylindrical case molded of synthetic resin. Therefore, the case is liable to be flexed or otherwise deformed. When an assembled cartridge is placed in a deformed case, a defective packaged product results.

Japanese laid-open patent publication No. 4-217511 discloses a pipeline transportation system including an aligning container for controlling the orientation of cylindrical bodies (cases) accommodated therein, a sorter for drawing and sorting out cylindrical bodies, and a transportation pipe smoothly joined to the sorter for delivering under suction those sorted-out cylindrical bodies which have a normal shape.

The sorter is positioned at a suction port of the aligning container, and is constricted into a diameter smaller than the inside diameter of the transportation pipe and slightly greater than the outside diameter of cylindrical bodies. When a deformed cylindrical body is sent to the suction port of the aligning container, the deformed cylindrical body is prevented from entering the transportation pipe by the sorter. However, because the deformed cylindrical body which is blocked by the sorter remained undelivered in the sorter, subsequent normal cylindrical bodies cannot smoothly be delivered into the transportation pipe. As a consequence, the pipeline transportation system is apt to suffer a cylindrical body delivery failure.

SUMMARY OF THE INVENTION

It is a general object of the present invention to provide a method of and a system for producing and packaging films to manufacture high-quality packaged products efficiently by inspecting products for defects in various manufacturing steps.

A primary object of the present invention is to provide a method of and a system for producing and packaging films to manufacture high-quality packaged products efficiently and economically by rejecting defective products in various manufacturing steps.

Another object of the present invention is to provide a method of and a system for producing and packaging films while quickly and reliably detecting parts defects when parts are being fed.

Still another object of the present invention is to provide a method of and a system for producing and packaging films while reliably detecting deformed parts fed from parts supply units and automatically and smoothly discharging deformed parts from feed paths.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 is a fragmentary side elevational view of a winding length abnormality detector;

FIG. 13 is a vertical cross-sectional view of a gap detector and a height detector;

FIG. 15 is a schematic plan view of an encasing unit;

DETAILED DESCRIPTION OF THE PREFERRED EMBODIMENT

Figure 1:
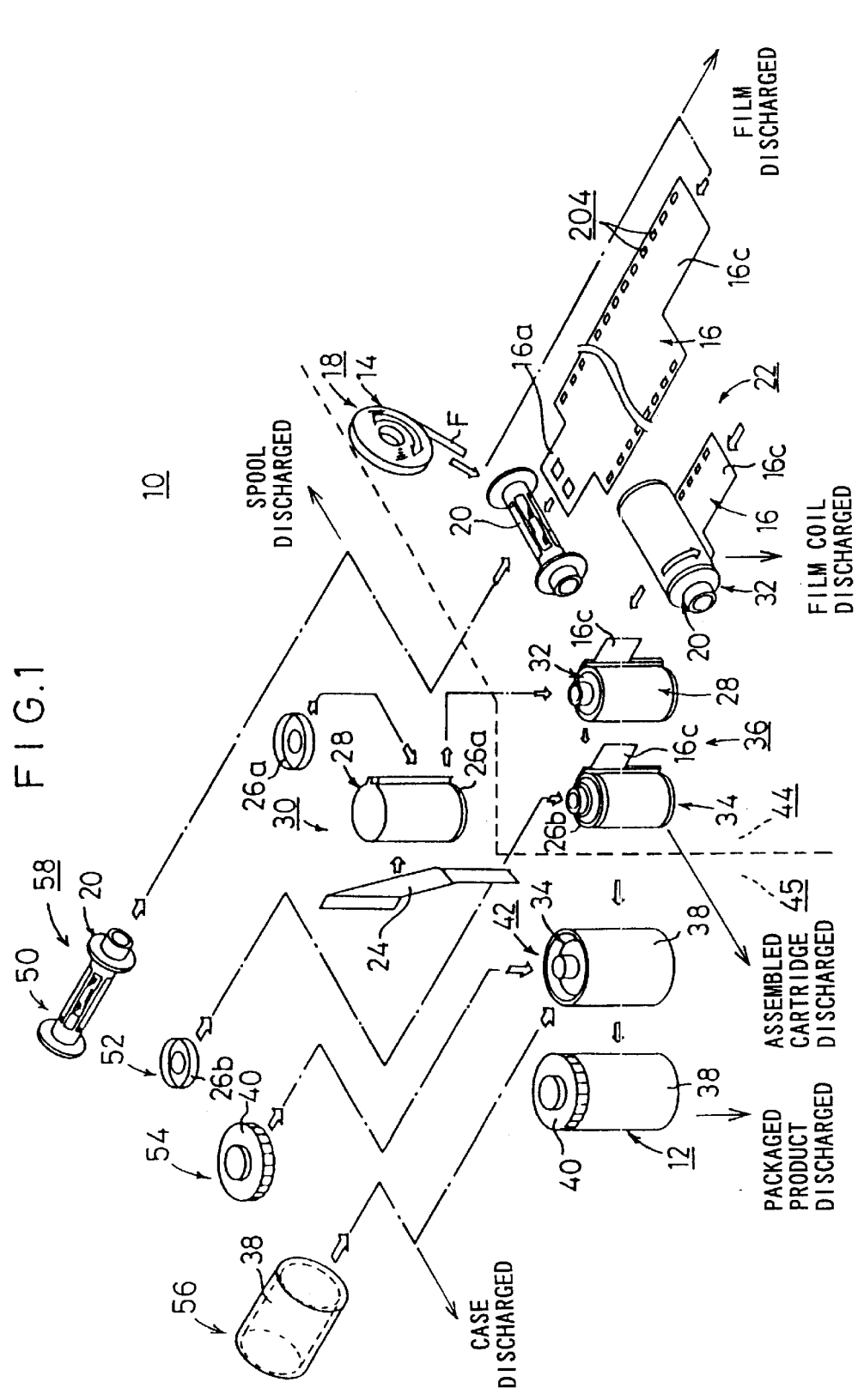
FIG. 1 is a schematic perspective view illustrative of the manner in which a packaged product is manufactured by a film producing and packaging system according to the present invention.

FIG. 1 illustrates in schematic perspective the manner in which a packaged product 12 is manufactured by a film producing and packaging system 10 according to the present invention. The film producing and packaging system 10 are shown in plane and side elevation in FIGS. 2 and 3, respectively.

Figure 2:
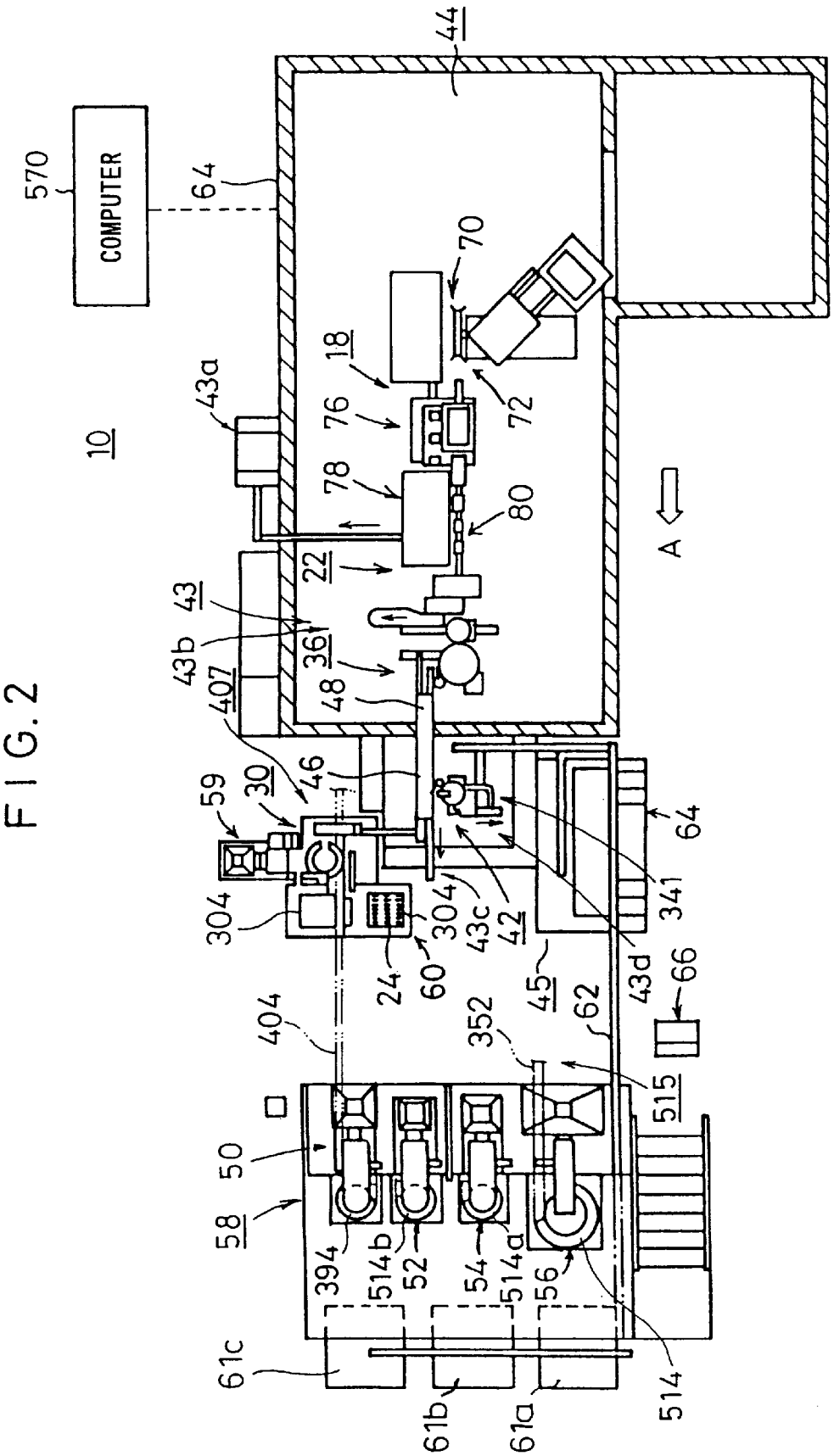
FIG. 2 is a schematic plan view of the film producing and packaging system.
Figure 3:
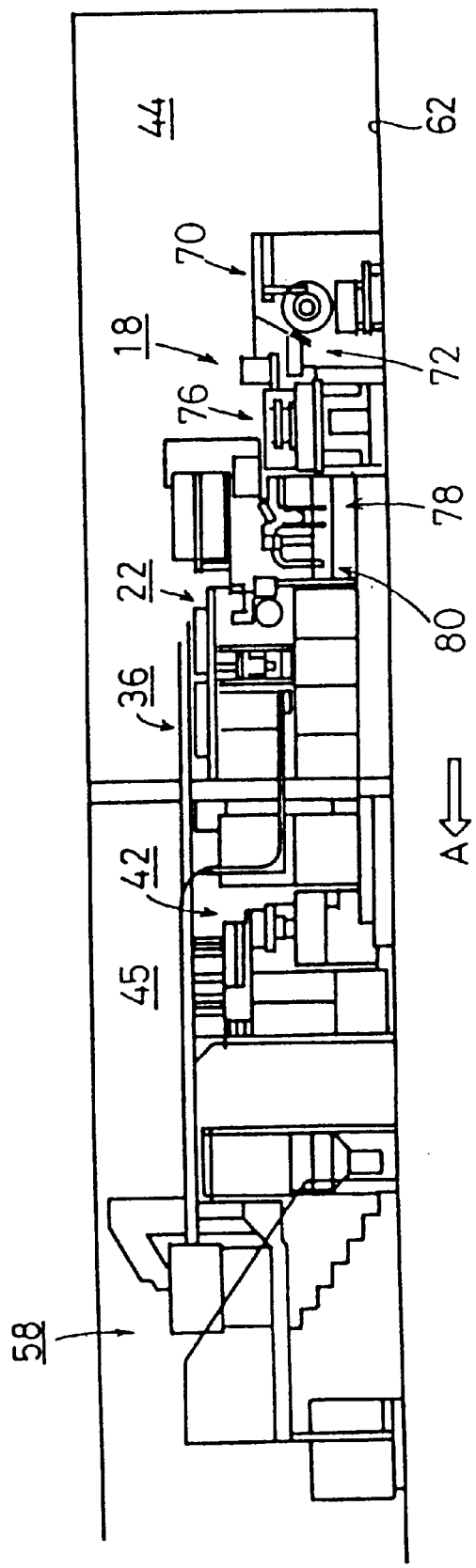
FIG. 3 is a schematic side elevational view of the film producing and packaging system.

As shown in FIGS. 1 through 3, the film producing and packaging system 10 generally comprises a film supply unit 18 for unwinding a film roll 14 of elongate photographic photosensitive film F (hereinafter referred to as elongate film F), cutting the unwound elongate film F into a film 16 of given length, and supplying the film 16, a film coiling unit 22 for positioning a spool (part) 20 and the film 16 relatively to each other and winding the film 16 on the spool 20, a cartridge producing unit 30 for rounding a cartridge blank sheet 24 into a tubular form and staking a cap 26a on one end of the tubular form thereby to produce a cartridge 28 with one open end, an assembling unit 36 for inserting a film coil 32, which is made up of the film 16 wound on the spool 20, into the cartridge 28 through the open end thereof, and then staking another cap 26b on the open end of the cartridge 28 thereby to produce an assembled cartridge 34, an encasing unit 42 for placing the assembled cartridge 34 into a case (part) 38 and attaching a case cap 40 to an open end of the case 38 thereby to produce a packaged product 12, and a defective product discharging unit 43 for individually discharging various defective products (described later on) that are produced until the packaged product 12 is manufactured.

The film supply unit 18, the film coiling unit 22, and the assembling unit 36 are housed in a dark room 44, and other devices, i.e., the encasing unit 42, etc. are housed in a bright room 45.

As shown in FIG. 2, the defective product discharging unit 43 comprises a defective film discharger 43a for cutting off a defective portion of the elongate film F unreeled from the film roll 14 and discharging the defective portion, a defective film roll discharger 43b for discharging a defective film roll 32a, a defective cartridge discharger 43c for discharging a defective assembled cartridge 34a produced by the assembling unit 36, and a defective case discharger 43d for discharging a defective case 38a into which no cartridge 34 is inserted.

As shown in FIG. 2, the film supply unit 18, the film coiling unit 22, the assembling unit 36, and encasing unit 42 are arrayed in line with each other along a film producing and packaging process as indicated by the arrow A. Between the dark room 44 and the bright room 45, there extend a first straight feed path 46 for delivering cartridges 28 from the cartridge producing unit 30 to the assembling unit 36 and a second straight feed path 48 for delivering assembled cartridges 34 from the assembling unit 36 to the encasing unit 42.

Downstream of the film producing and packaging process, there is disposed a parts supply apparatus 58 comprising a spool supply unit 50 for supplying spools 20 to the film coiling unit 22, a cap supply unit 52 for supplying caps 26b to the assembling unit 36, a case cap supply unit 54 for supplying case caps 40 to the encasing unit 42, and a case supply unit 56 for supplying cases 38 to the encasing unit 42. The spool supply unit 50, the cap supply unit 52, the case cap supply unit 54, and the case supply unit 56 are closely positioned in the housing of the parts supply apparatus 58.

A cap supply unit 59 for supplying caps 26a and a cartridge blank sheet supply unit 60 for supplying cartridge blank sheets 24 are disposed near the cartridge producing unit 30.

Packaged product accumulating units 61a, 61b, 61c are disposed near the parts supply apparatus 58. The packaged product accumulating units 61a, 61b, 61c and the encasing unit 42 are coupled to each other by a conveyor 62 which is associated with a semifinished product accumulating unit 64. A control console 66 is disposed near the conveyor 62.

Figure 4:
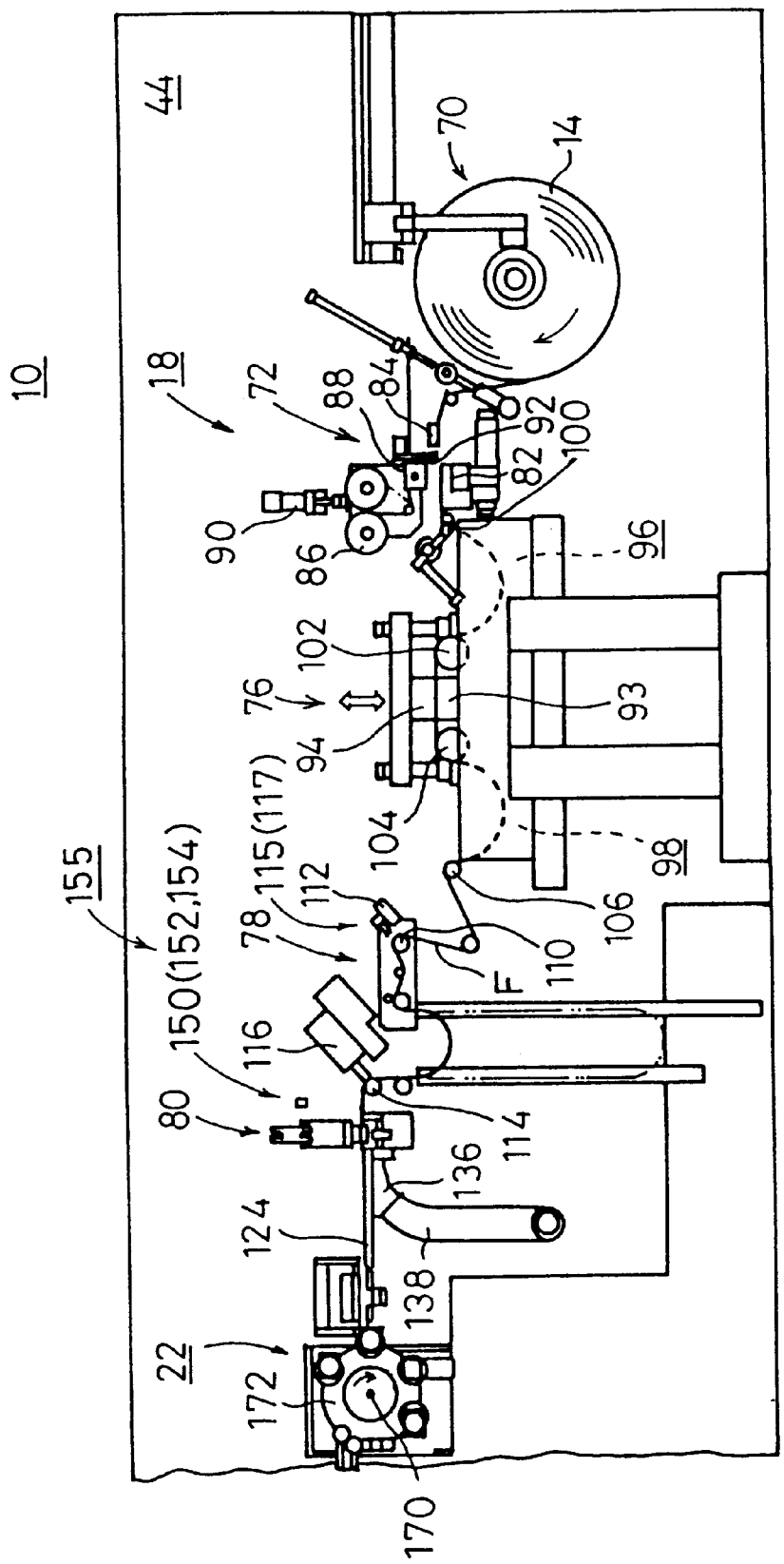
FIG. 4 is a side elevational view of a film supply unit of the film producing and packaging system.
Figure 5:
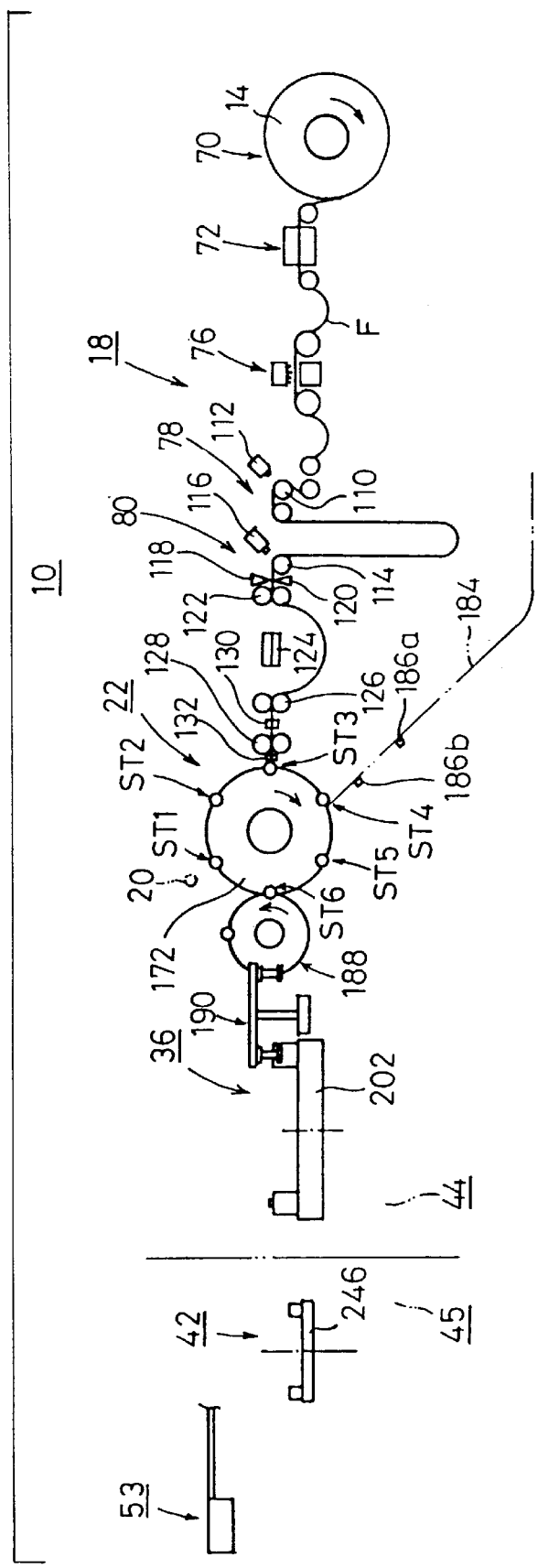
FIG. 5 is a schematic side elevational view of a succession of units ranging from the film supply unit to an assembling unit of the film producing and packaging system.

As shown in FIGS. 4 and 5, the film supply unit 18 comprises a feeder 70 for holding and unwinding a film roll 14, a splicer 72 for splicing a trailing end of the film roll 14 to a starting end of a new film roll 14, a perforator 76 forming perforations 74 (see FIG. 1) in opposite longitudinal sides of an elongate film F unwound from the film roll 14, a side printer 78 for printing latent image data on one or both of the sides of the elongate film F, and a cutter 80 for cutting off the elongate film F to films 16 of given length.

The splicer 72 comprises a splicing base 82 for attracting and holding the trailing end of an elongate film F and an auxiliary base 84 for attracting and holding the leading end of a new elongate film F. The splicer 72 also has a rotatable application base 88 of square cross section for feeding a splicing tape 86, which comprises a double-sided adhesive tape, a predetermined length in each feed cycle. The application base 88 is vertically movable in unison with a tape cutter 92 by a cylinder 90.

The perforator 76 has a fixed die block 93 and a punch block 94 disposed upwardly of the die block 93 and vertically movable by an actuator (not shown) positioned below the die block 93. The perforator 76 also has a pair of suction chambers 96, 98 disposed respectively upstream and downstream of the punch block 94. A path roller 100 and a feed roller 102 are intermittently rotatably positioned upwardly of the suction chamber 96, and a sprocket roller 104 and a path roller 106 are intermittently rotatably positioned upwardly of the suction chamber 98.

The side printer 78 comprises a first printing mechanism 112 disposed in confronting relationship to a constant-speed-feed path roller 110 and a second printing mechanism 116 disposed in confronting relationship to a constant-length-feed path roller 114. The first printing mechanism 112 records a web-shaped print depending on the type of the film as a latent image on one or both sides of elongate films F, and the second printing mechanism 116 records a DX bar code, frame numbers, frame number bar codes, a commercial name, depending on the size of the film as latent images on one or both sides of elongate films F.

As shown in FIG. 4, the first printing mechanism 112 has a film floating detector 115 for detecting whether an elongate film F is held in contact with an outer circumferential surface of the path roller 110 or not, and a light emission detector 117 for detecting whether the first printing mechanism 112 emits light or not. The film floating detector 115 has an infrared reflective photosensor (not shown) for detecting whether an elongate film F is floating off the outer circumferential surface of the path roller 110 or not. The light emission detector 117 has a light emission commanding unit for issuing a light emission command signal to each of a plurality of light-emitting elements of the first printing mechanism 112, a light emission detector for detecting a light-emitting state of each of the light-emitting elements based on a current flowing through each of the light-emitting elements and issuing a light emission confirming signal for each of the light-emitting elements, and a decision unit for comparing each light emission command signal with a corresponding light emission confirming signal to decide whether these signals agree with each other (see Japanese patent No. 2506165). The second printing mechanism 116 also has a film floating detector and a light emission detector which are similar to those described above.

As shown in FIG. 5, the cutter 80 comprises a movable blade 118 and a fixed blade 120 which are disposed in vertically spaced and confronting relationship to each other, and cutting the elongate film F to a predetermined length as a sized film 16 depending on the desired size of the film 16. Downstream of the cutter 80, there are disposed end feed nip rollers 122, an openable and closable guide 124, insertion roller pairs 126, 128, and guide plates 130, 132. The openable and closable guide 124 is retractable out of the film feed path. As shown in FIG. 4, a discharge receptacle 136 of the defective film discharger 43a is disposed below the openable and closable guide 124 for discharging a defective film.

Figure 6:
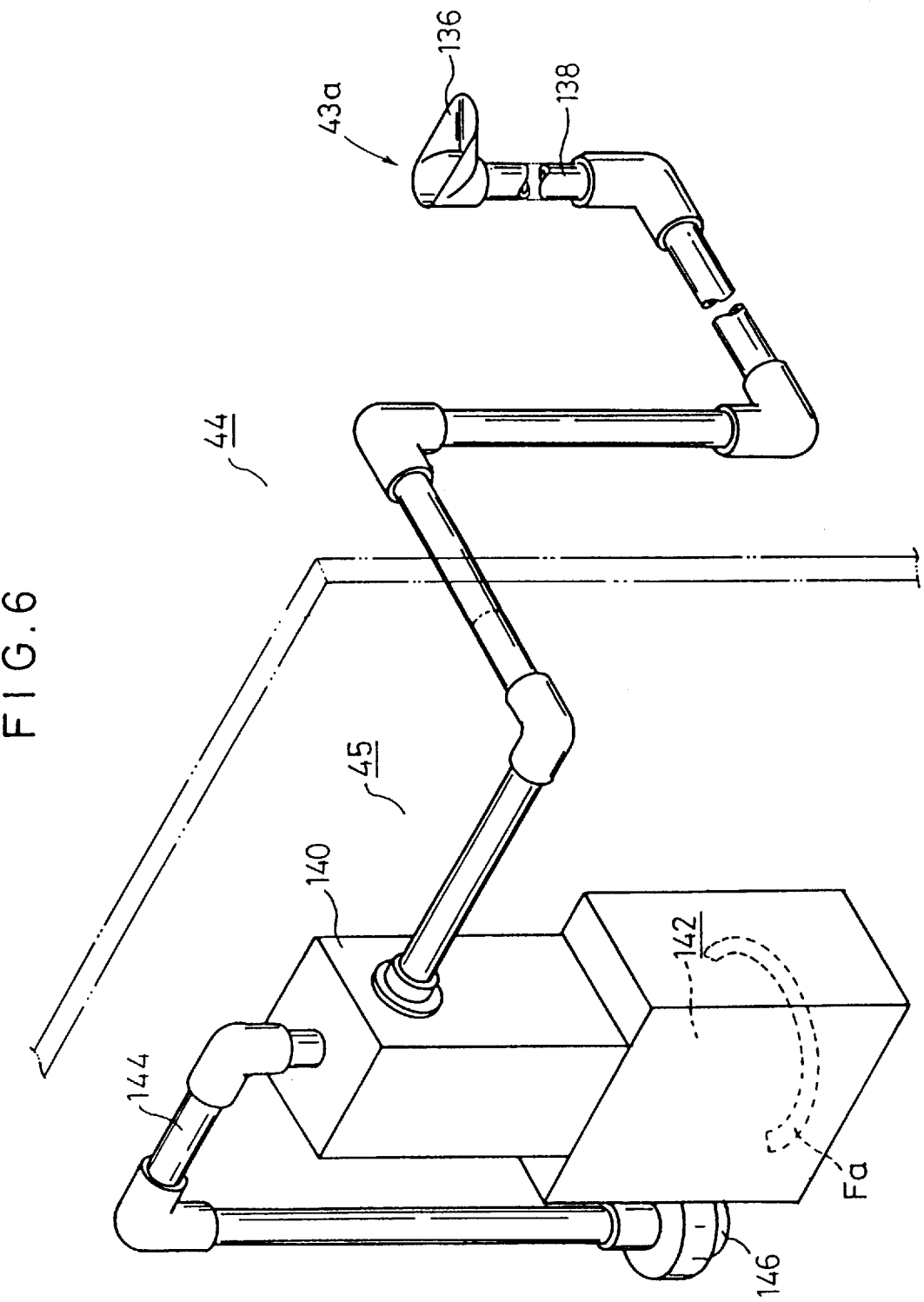
FIG. 6 is a perspective view of a defective film discharging structure of the film supply unit.

As shown in FIGS. 4 and 6, the discharge receptacle 136 is movable into and out of the film feed path in directions perpendicular to the sheet of FIG. 4. The discharge receptacle 136 is connected to an end of a discharge chute 138 in the form of a pipe of a synthetic resin such as vinyl chloride, for example. The other end of the discharge chute 138 extends from the dark room 44 into the bright room 45 where it communicates with an accumulation chamber 142 (see FIG. 6) within a discharge box 140. To an upper portion of the discharge box 140, there is connected an end of a pipe 144 which extends vertically downwardly and is connected to an air blower 146.

Near an upstream portion of the cutter 80, there is disposed a film inspecting device 155 comprising a film position detector 150 for detecting a positional deviation of perforations 74 in an elongate film F, a full length detector 152 for detecting the full length of the elongate film F, and a splicing detector 154 for detecting a splicing tape (spliced region) 86 by which the trailing end of the elongate film F is spliced to the leading end of a new elongate film F.

Figure 7A:
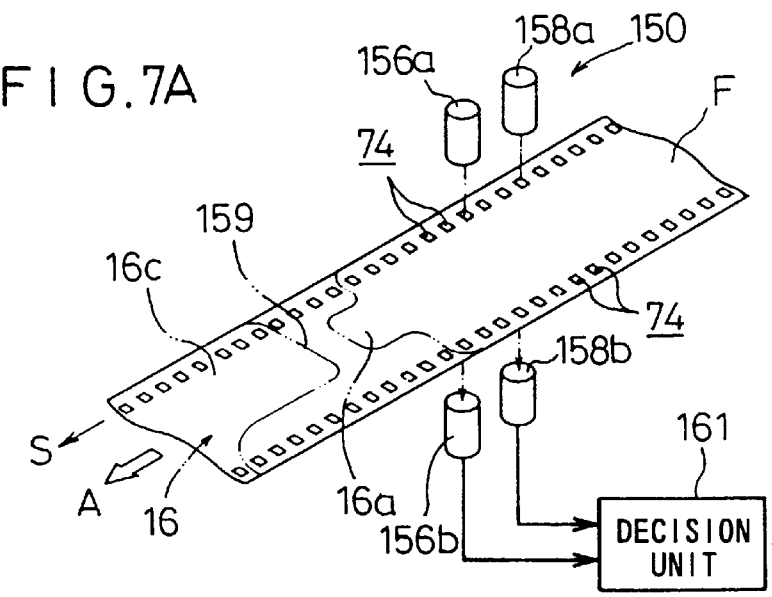
FIG. 7A is a perspective view of a film position detector.

As shown in FIG. 7A, the film position detector 150 has two confronting pairs of infrared photosensors directed to a path S along which perforations 74 defined in a longitudinal edge of the elongate film F pass as the elongate film F is unwound in the direction indicated by the arrow A. Specifically, the confronting pairs of infrared photosensors comprise an upper pair of first and second light-emitting elements 156a, 158a for emitting respective rays of infrared radiation and a lower pair of first and second light-detecting elements 156b, 158b for detecting the respective rays of infrared radiation emitted from the first and second light-emitting elements 156a, 158a.

The first and second light-emitting elements 156a, 158a, which are positioned above the path S, are spaced a given distance from an end face (end face of the trailing end 16c) 159 where the elongate film F is to be cut off by the cutter 80, and also spaced a predetermined distance from the first and second light-detecting elements 156b, 158b, which are positioned below the path S. If the elongate film F is positioned accurately with respect to the cutter 80, then inspecting rays (infrared radiation) emitted from the respective first and second light-emitting elements 156a, 158a pass through respective perforations 74 to the respective first and second light-detecting elements 156b, 158b, which then issue respective ON signals.

The first and second light-detecting elements 156b, 158b are electrically connected to a decision unit 161. The decision unit 161 determines that perforations 74 are located in a desired cutting position and do not lie across the end face 159 only when ON signals are supplied from the first and second light-detecting elements 156b, 158b.

Figure 7B:
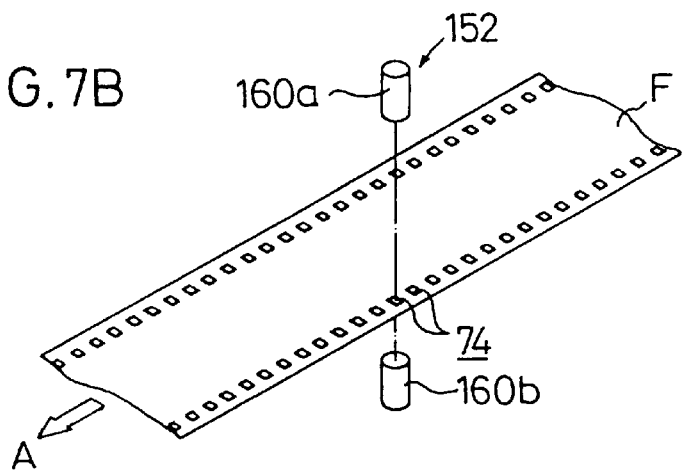
FIG. 7B is a perspective view of a full length detector.

As shown in FIG. 7B, the full length detector 152 comprises an infrared photosensor, which comprises a light-emitting element 160a and a light-detecting element 160b, for counting perforations 74 to detect the full length of an elongate film F.

Figure 7C:
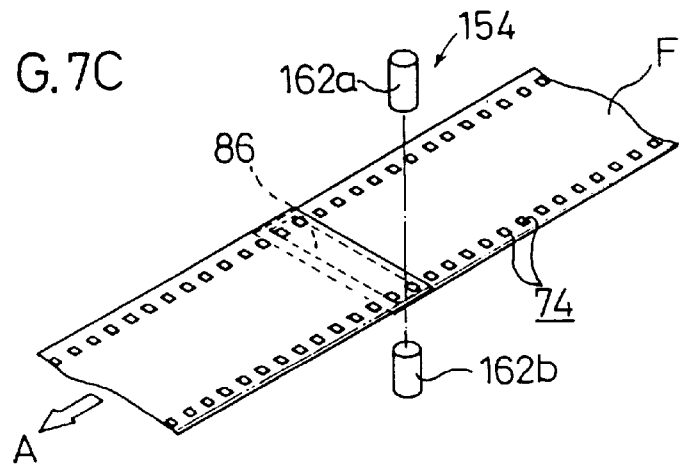
FIG. 7C is a perspective view of a splice detector.

As shown in FIG. 7C, the splicing detector 154 comprises an infrared photosensor, which comprises a light-emitting element 162a and a light-detecting element 162b, for detecting a splicing tape 86 on an elongate film F.

Figure 8:
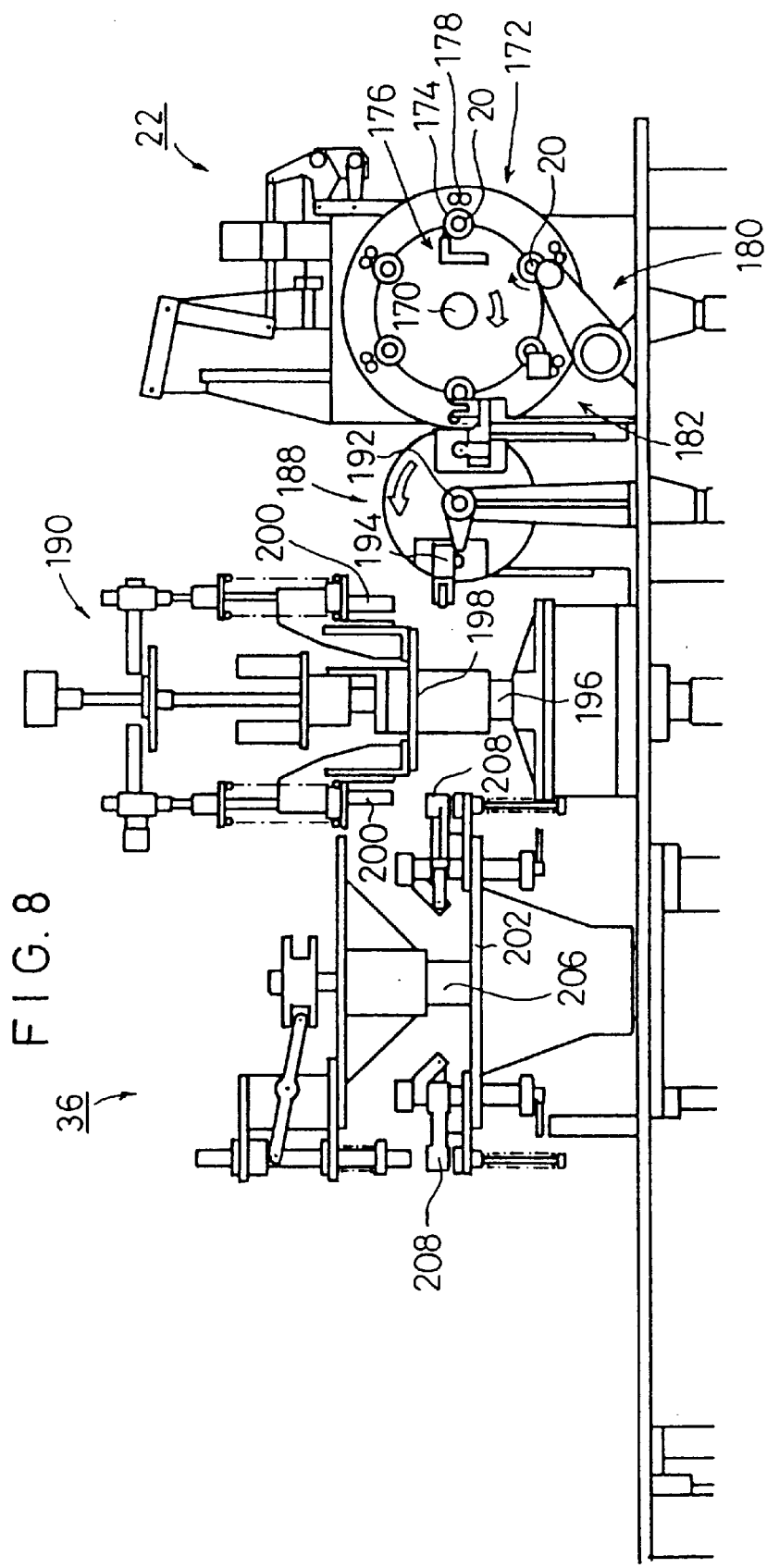
FIG. 8 is a side elevational view of a film coiling unit and the assembling unit of the film producing and packaging system.

As shown in FIG. 8, the film coiling unit 22 comprises a turntable 172 fixed to a main shaft 170 rotatable in the direction indicated by the arrow, a plurality of, e.g., six, spool chucks 174 mounted at equal angular intervals on the turntable 172, a spool positioner 176 for positioning spools 20 held by the spool chucks 174, a plurality of nip rollers 178 for pressing sized films 16 with their leading ends 16a inserted in the spools 20, a prewinder 182 for prewinding the sized films 16, and a winder 182 for winding the sized films 16 which have been prewound by the prewinder 180.

As shown in FIG. 5, the turntable 172 has thereon a spool supply station ST1, a spool positioning station ST2, an inserting station ST3, a prewinding station ST4, a winding station ST5, and a transfer station ST6 which are successively angularly positioned clockwise (in the direction indicated by the arrow) in the order named. The turntable 172 is associated with a self-locking brake (not shown) for preventing the spools 20 from rotating.

A film guide 184 extends toward the prewinding station ST4, and is associated with first and second infrared photosensors 186a, 186b spaced from each other along the film guide 184. When a trailing end 16c of a sized film 16 prewound on a spool 20 in the prewinding station ST4 passes across the first photosensor 186a, the prewinder 180 is decelerated. When the same trailing end 16c passes across the second photosensor 186b, the prewinder 180 is stopped.

As shown in FIG. 9, a winding length abnormality detector 185 for detecting whether the length of the trailing end 16c of a sized film 16 prewound on a spool 20 by the prewinding station ST4 is abnormal or not is disposed between the prewinding station ST4 and the winding station ST5. The winding length abnormality detector 185 comprises a downwardly concave guide 187 and an infrared photosensor which comprises a light-emitting element 189a and a light-detecting element 189b facing each other across the guide 187. The guide 187 has holes (not shown) defined therein and positioned on the optical axis of the light-emitting element 189a and the light-detecting element 189b.

The winding length abnormality detector 185 operates before and after a sized film 16 is wound in the winding station ST5. Specifically, before a sized film 16 is wound in the winding station ST5, the winding length abnormality detector 185 decides whether the trailing end 16c of the sized film 16 has a sufficient length, i.e., whether the trailing end 16c is properly introduced in the guide 187. After a sized film 16 is wound in the winding station ST5, the winding length abnormality detector 185 detects whether the trailing end 16c of the sized film 16 has been wound to a desired length.

As shown in FIG. 8, a first transfer unit 188 and a second transfer unit 190 are disposed downstream of the film coiling unit 22. The first transfer unit 188 receives a film coil 32, which comprises a sized film 16 wound on a spool 20, from one of the spool chucks 174, and converts the film coil 32 from a horizontal attitude to a vertical attitude while making a 180° turn about its own axis. The first transfer unit 188 comprises a rotatable shaft 192 and a holder 194 rotatable by the rotatable shaft 192 in the direction indicated by the arrow.

The second transfer unit 190 comprises a turntable 198 supported by a vertical rotatable shaft 196 and rotatable about a vertical axis by the vertical rotatable shaft 196. A plurality of vertically movable grips 200 are mounted on the turntable 198. The second transfer unit 190 inserts a film coil 32 received from the first transfer unit 188 into a single-open-ended cartridge 28 placed on an index table 202 of the assembling unit 36.

Figure 10:
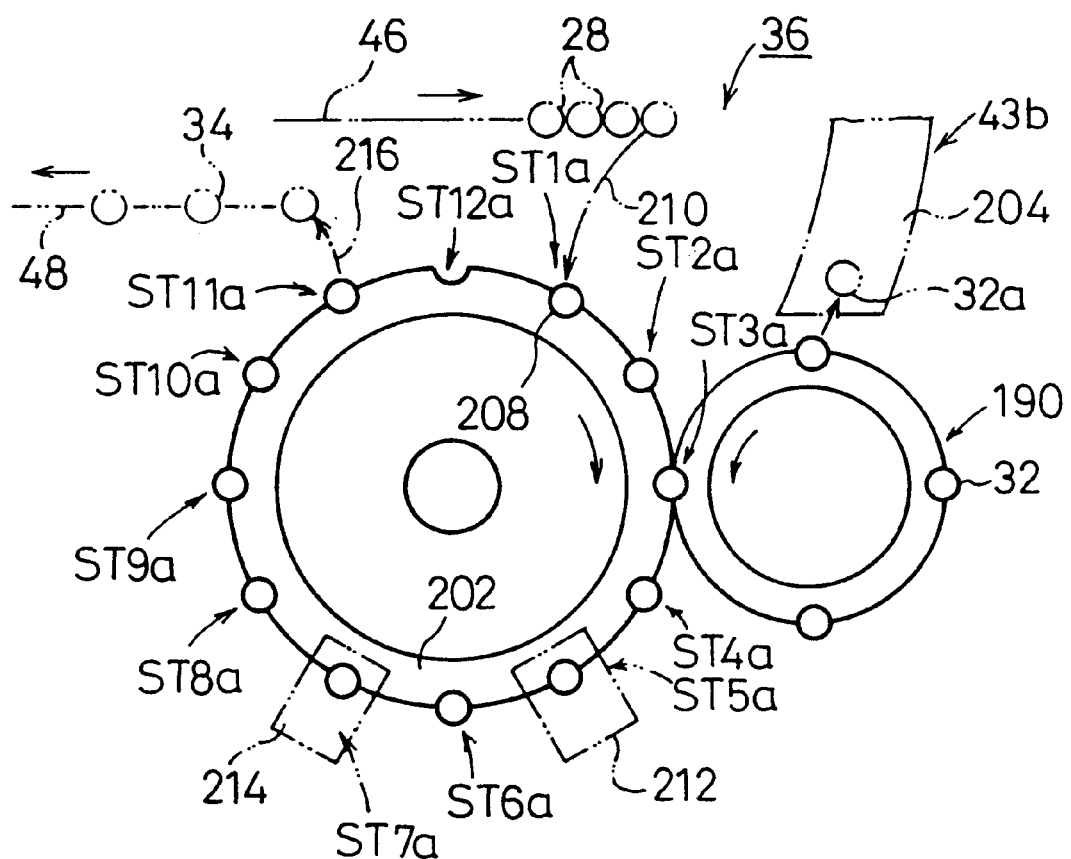
FIG. 10 is a schematic plan view of the assembling unit.

As shown in FIG. 10, the defective film roll discharger 43b has a discharge chute 204 disposed near the second transfer unit 190. A defective film coil 32a can be discharged to the discharge chute 204 by a discharging unit (not shown).

As shown in FIG. 8, the index table 202 is fixedly mounted on a vertical rotatable shaft 206 for indexing movement to angularly spaced positions. Chucks 208 is mounted on the index table 202 for positioning and holding single-open-ended cartridges 28 in respective stations (described below) corresponding to those angularly spaced positions.

As shown in FIG. 10, the index table 202 can successively be indexed to a single-open-ended cartridge supply station ST1a, a single-open-ended cartridge detecting station ST2a, a film-wound spool inserting station ST3a, a spool detecting and chuck opening station ST4a, a cap supply station ST5a, a chuck centering idle station ST6a, a cap crimping station ST7a, an idle station ST8a, a cap height and torque detecting station ST9a, a tongue (the trailing end 16c of a sized film 16) length detecting station ST10a, a product unloading station ST11a for delivering an assembled cartridge 34 from the index table 202 to the second straight feed path 48, and a remaining cartridge detecting station ST12a for detecting whether an assembled cartridge 34 remains on the index table 202.

The single-open-ended cartridge supply station ST1a is associated with a loading unit 210 for loading a single-open-ended cartridge 28 from the first straight feed path 46 onto the index table 202. The cap supply station ST5a is associated with a cap feed unit 212. The cap crimping station ST7a is associated with a pressing unit 214. The product unloading station ST11a is associated with an unloading unit 216 for unloading an assembled cartridge 34 from the index table 202 to the second straight feed path 48.

Figure 11:
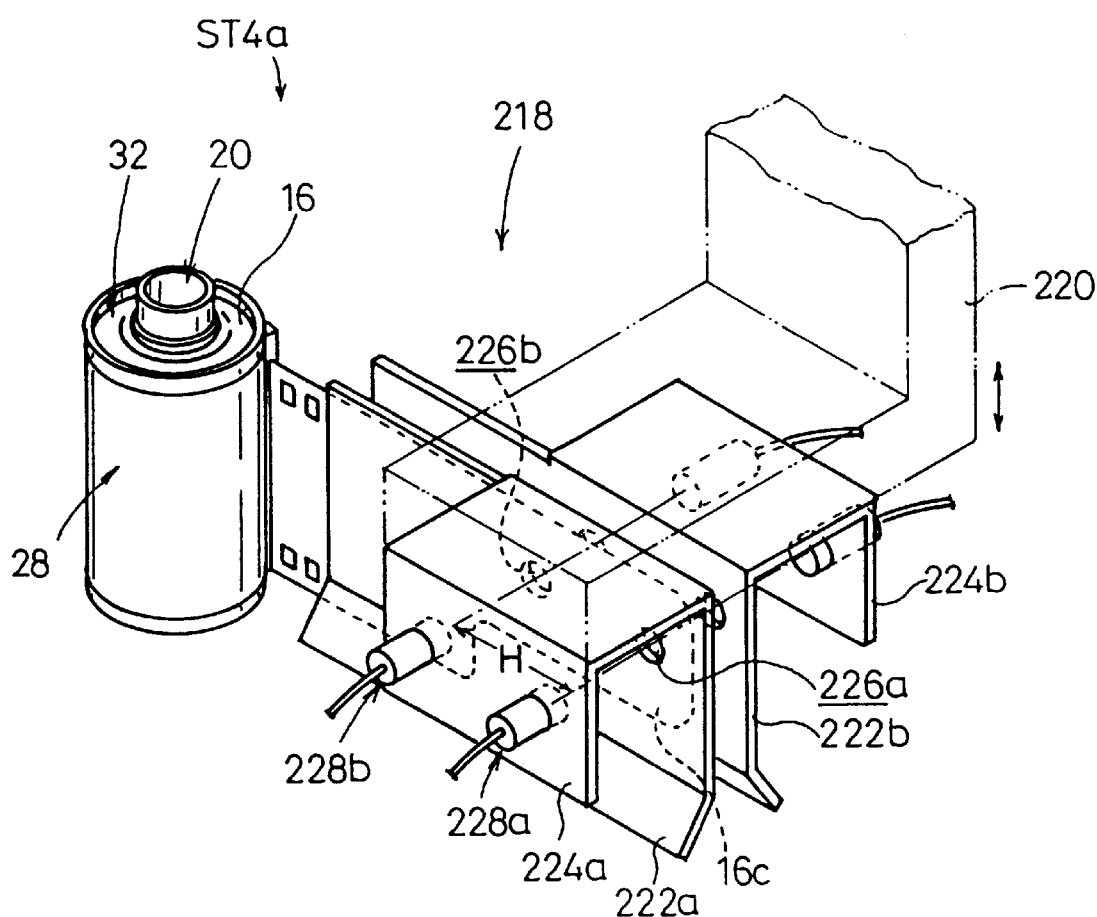
FIG. 11 is a perspective view of a tongue detector.

As shown in FIG. 11, the spool detecting and chuck opening station ST4a has a tongue detector 218 for detecting whether a film coil 32 is fully inserted in a single-open-ended cartridge 28, i.e., whether a trailing end 16c thereof is exposed from an end of the single-open-ended cartridge 28. The tongue detector 218 comprises a block 220, which is vertically movable by a vertically displacing unit (not shown), supporting thereon a pair of guide plates 222a, 222b for guiding the trailing end 16c and a pair of brackets 224a, 224b, joined respectively to the guide plates 222a, 222b, for attachment of sensors.

The guide plates 222a, 222b have respective lower ends flaring outwardly away from each other. Each of the guide plates 222a, 222b has a pair of holes 226a, 226b defined therein at a horizontally spaced interval H. Two transmissive infrared photosensors 228a, 228b are mounted on the brackets 224a, 224b in alignment with the holes 226a, 226b, respectively.

The spool detecting and chuck opening station ST4a has a photosensor for detecting a spool 20, and a proximity sensor for detecting a closed state of a chuck 208 which can be opened by a switch (not shown).

The tongue length detecting station ST10a has a tongue detector which is similar to the tongue detector 218.

Figure 12:
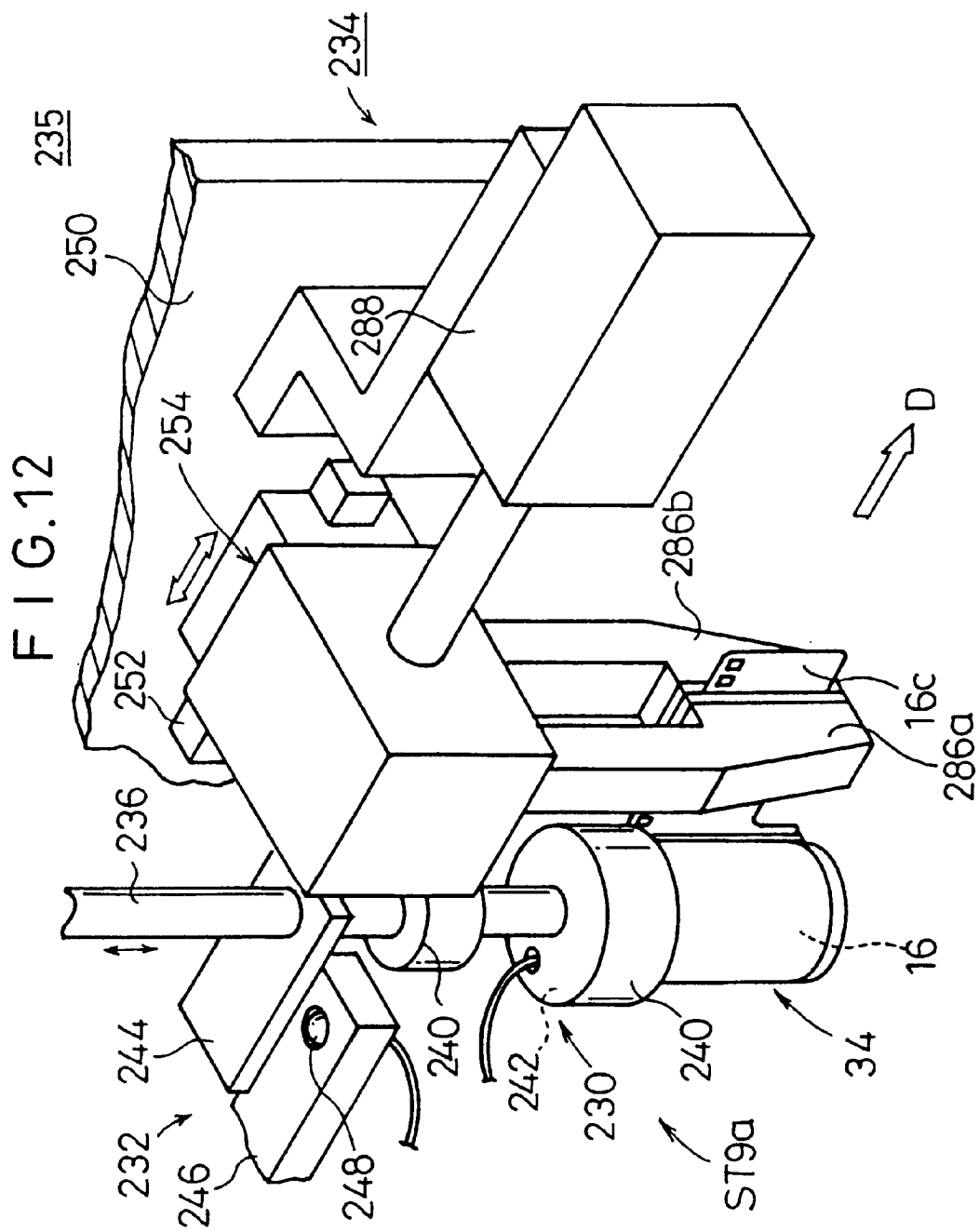
FIG. 12 is a perspective view of a torque detector.

As shown in FIG. 12, the cap height and torque detecting station ST9a has an assembled cartridge inspecting unit 235 which comprises a cap detector 230 for detecting whether there is a cap 26b of an assembled cartridge 34, a height detector 232 for detecting an increased height of the assembled cartridge 34 due to a crimping failure or the like of the cap 26b, and a torque detector 234 for detecting a torque needed when the trailing end 16c of a sized film 16 projecting from an assembled cartridge 34 is pulled out to a predetermined torque, and determining that the assembled cartridge 34 is defective if the detected torque is greater than a predetermined torque.

As shown in FIGS. 12 and 13, a rod 236 vertically movable by a cam mechanism (not shown) is guided by a bearing 238, and supports a dog 240 on its lower end. The dog 240 has a centrally concave lower surface for avoiding the upper end of a spool 20 in an assembled cartridge 34. The cap detector 230 comprises a proximity sensor 242 embedded in a peripheral region of the dog 240. The proximity sensor 242 serves to detect a cap 26b, which is made of metal, of the assembled cartridge 34.

To the rod 236, there is secured an end of a height detecting bar 244 whose opposite end is disposed above a reflective photosensor 248 of the height detector 232 which is embedded in a fixed block 246. The reflective photosensor 248 measures a distance T between itself and the height detecting bar 244 to decide whether the cap 26b suffers a crimping failure or not.

As shown in FIG. 12, the torque detector 234 comprises a movable bracket 250 movable in the direction indicated by the arrow D by a cam mechanism (not shown), and a hand 254 movably supported on the movable bracket 250 by a rail 252 for back-and-forth movement in directions parallel to the direction indicated by the arrow D. The hand 254 has a pair of downwardly extending grips 286a, 286b for gripping the training end 16c of a sized film 16. A load cell 288 fixed to the movable block 250 is connected to the hand 254. If a resistance detected by the load cell 254 when the grips 286a, 286b pull the training end 16c of the sized film 16 out of the assembled cartridge 34 is 250 gf or less, then the assembled cartridge 34 is determined as being accepted.

Figure 14:
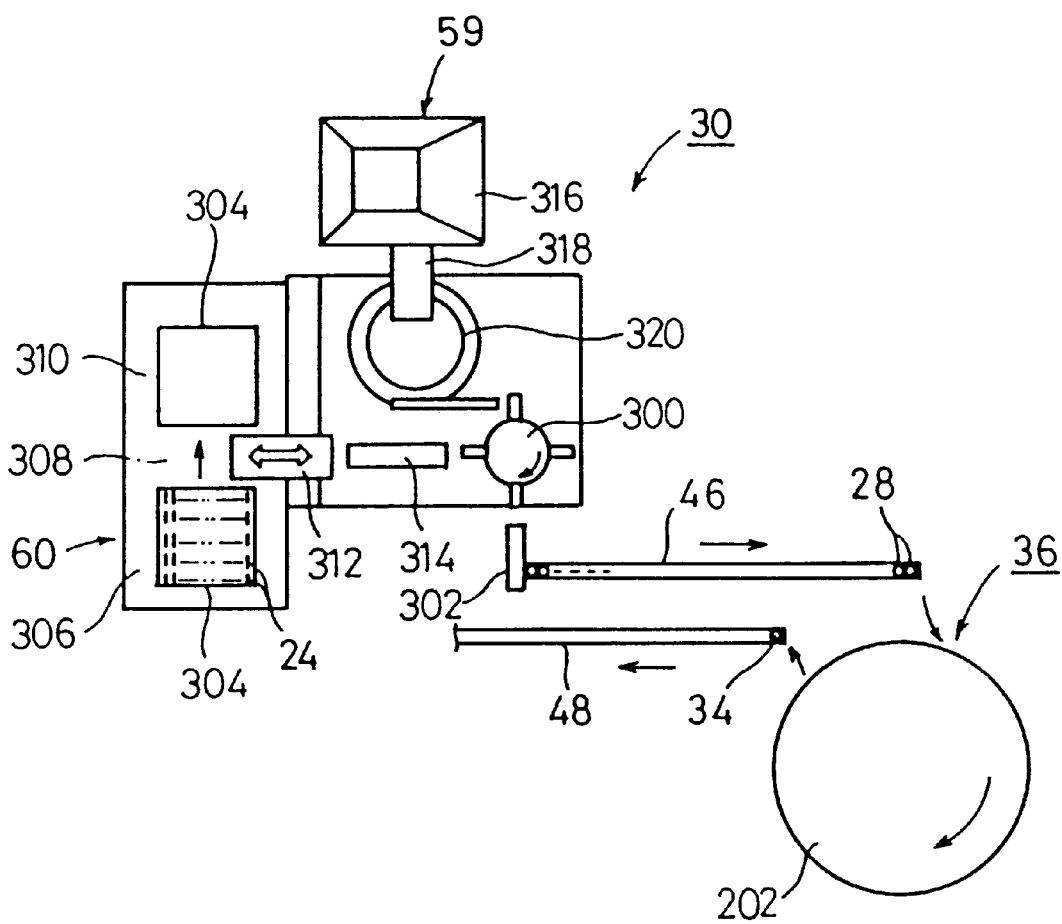
FIG. 14 is a schematic plan view of a cartridge producing unit.

As shown in FIG. 14, cartridge blank sheets 24 are rounded into single-open-ended cartridges 28 by a rounding index disk 300, which rotates about its own axis, and the single-open-ended cartridges 28 produced by the rounding index disk 300 are held by an oblique feed path 302 and hen converted from a horizontal attitude to a vertical attitude, after which they are delivered into the first straight feed path 46.

The cartridge blank sheet supply unit 60 disposed adjacent to the cartridge producing unit 30 has an inlet position 306 for introducing a container 304 which contains a plurality of cartridge blank sheets 24 vertically in a plurality of arrays, e.g., five arrays, a removal position 308 for removing one array, at a time, of cartridge blank sheets 24 from the container 304, and an outlet position 310 for discharging an empty container 304 from which all cartridge blank sheets 24 have been removed. The type of all cartridge blank sheets 24 in the container 306 has been detected in a formation process therefor.

The cartridge blank sheet supply unit 60 has a cartridge blank sheet removal mechanism 312 aligned with the removal position 308. The cartridge blank sheet removal mechanism 312 is movable between the container 304 and an inclined conveyor 314 which serves to deliver cartridge blank sheets 24 to the rounding index disk 300.

The cap supply unit 59 has a hopper 316 for storing a plurality of caps 26a. A vertically movable component lifter 318 for removing a certain number of caps 26a from the hopper 316 and holding the removed caps 26a is reciprocally movably positioned between the hopper 316 and a feeder 320 positioned upwardly of the hopper 316. The component lifter 318 removes a certain number of caps 26a from the hopper 316 in the lower end of its vertical stroke, then is lifted, and automatically supplies the caps 26a to the feeder 320.

As shown in FIG. 15, the second straight feed path 48 extends from the dark room 44 to the encasing unit 42 in the bright room 45, and is covered with a light-shield cover 322 for preventing ambient light from entering from the bright room 45 into the dark room 44 along the second straight feed path 48. At a terminal end of the second straight feed path 48, there is disposed a discharge chute 324 of the defective cartridge discharger 43c for discharging a defective assembled cartridge 34a inspected in the assembling unit 36 without delivering it to the encasing unit 42.

Figure 16:
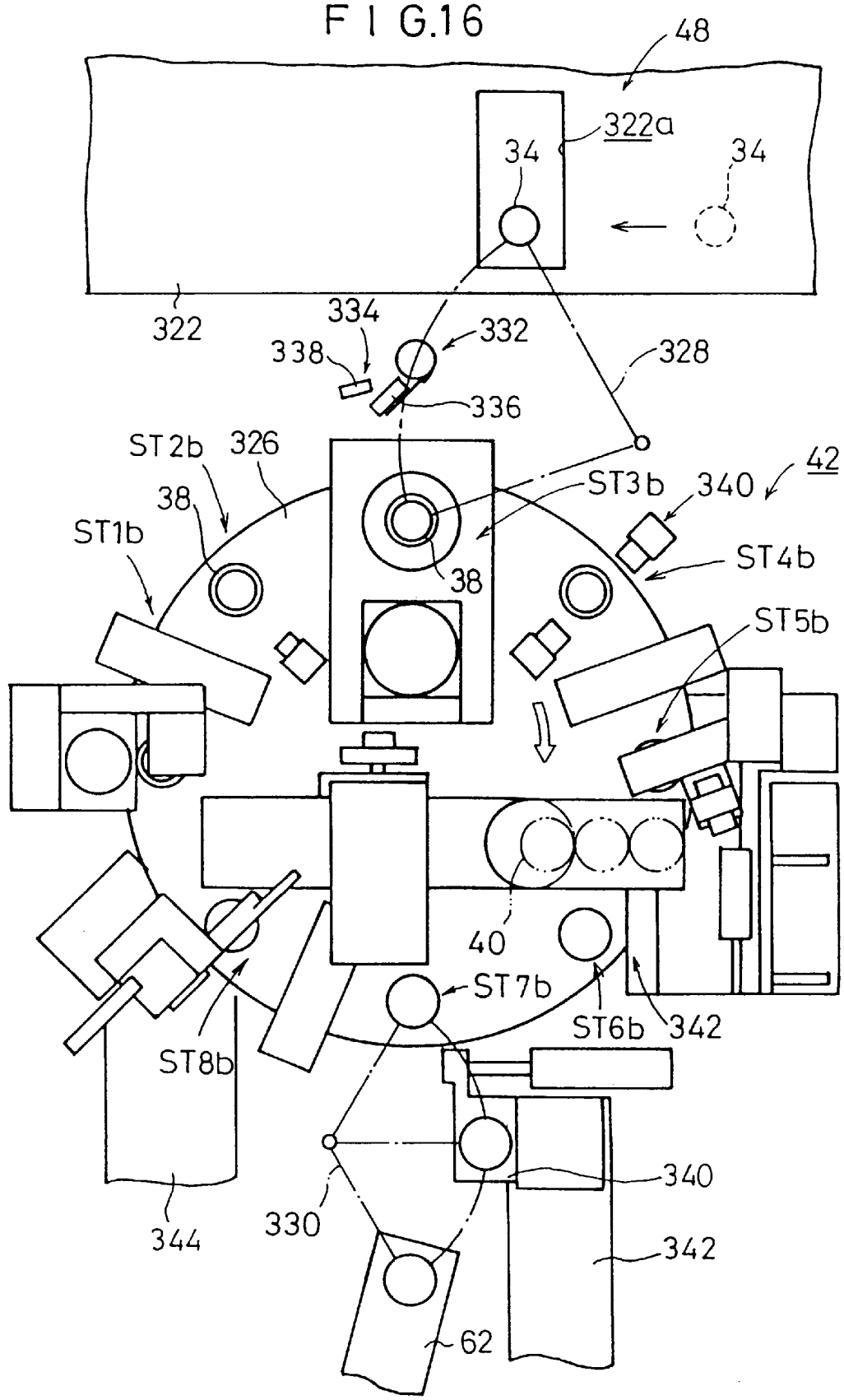
FIG. 16 is a plan view of the encasing unit.

As shown in FIGS. 15 and 16, the encasing unit 42 comprises an index table 326 rotatable about its own axis clockwise in the direction indicated by the arrow for indexing movement to eight angularly spaced positions. The index table 326 can successively be indexed to a case supply station ST1b for supplying a case 38, an idle station ST2b, a cartridge inserting station ST3b for inserting an assembled cartridge 34 into the case 38, a cartridge detecting station ST4b for detecting whether there is an assembled cartridge 34 or not, a case cap inserting station ST5b for inserting a case cap 40 into the open end of the case 38, an idle station ST6b, a normal packaged product discharging station ST7b for discharging a normal packaged product 12 and a sample product 12a, and a defective packaged product discharging station ST8b for discharging a defective packaged product 12.

The cartridge inserting station ST3b is associated with a cartridge loading unit 328 for inserting an assembled cartridge 34 picked up from the second straight feed path 48 into a case 38. The normal packaged product discharging station ST7b is associated with an unloading unit 330 for unloading a normal packaged product 12 and a sample product 12a from the index table 326.

As shown in FIG. 16, the cartridge loading unit 328 has an intermediate position 332 between the second straight feed path 48 and the cartridge inserting station ST3b, and a bar-code reading unit 334 is disposed in the intermediate position 332. A guide plate 336 is also disposed in the intermediate position 332 for forcibly separating a trailing end 16c projecting out of an assembled cartridge 34 from a bar code (not shown) printed on an outer circumferential surface of the assembled cartridge 34. The bar-code reading unit 334 has a bar-code reader 338 for reading the bar code on the assembled cartridge 34.

The unloading unit 330 has an intermediate placement area 340 for temporarily placing thereon a packaged product 12 picked up from the index table 326. A packaged product 12 temporarily placed on the intermediate placement area 340 is delivered to the conveyor 62. When a sample product 12a is temporarily placed on the intermediate placement area 340, it is delivered to a sample product chute 342 that extends from the intermediate placement area 340 to a sample product accumulating unit 341 (see FIG. 2). The defective case discharger 43d has a discharge chute 344 disposed in the defective packaged product discharging station ST8b.

Figure 17:
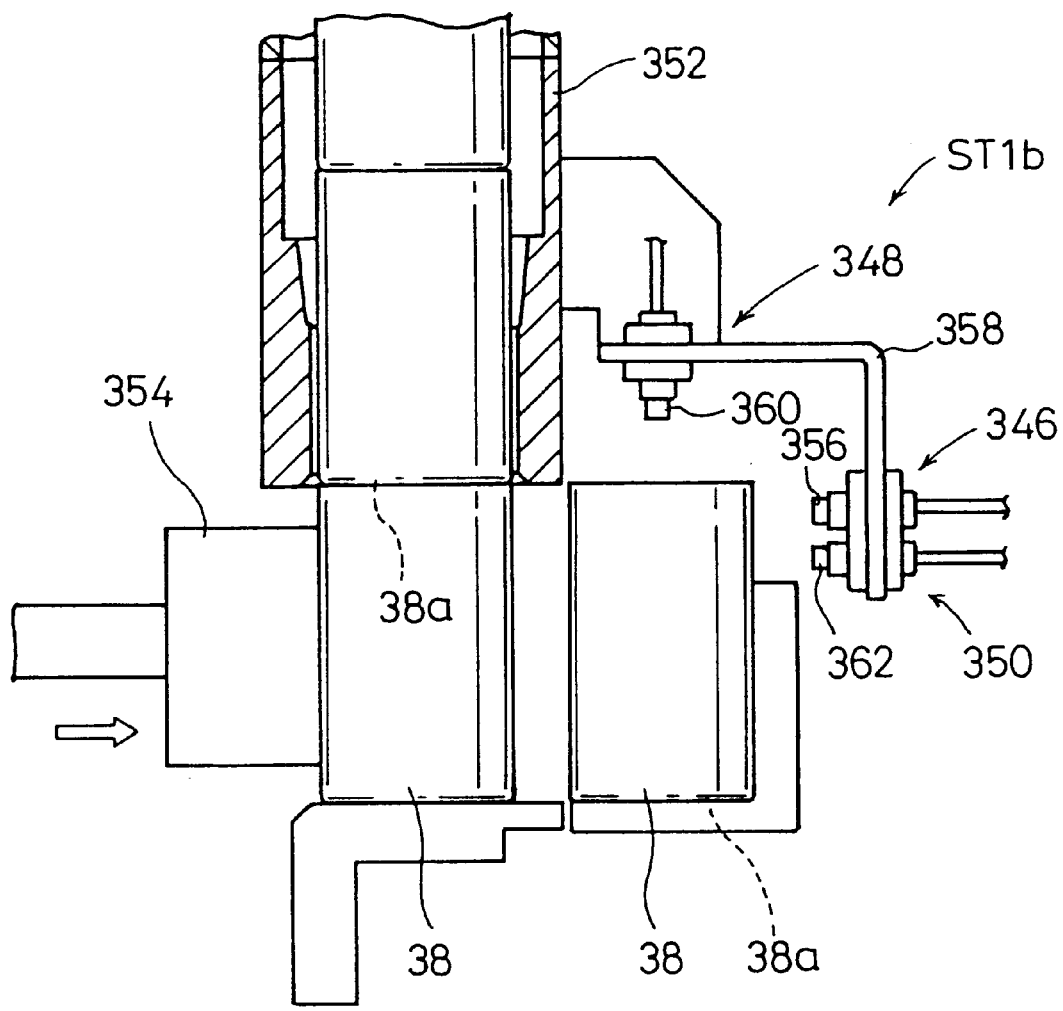
FIG. 17 is a view of various detectors for detecting a case, a case inversion, and a case color difference.

As shown in FIG. 17, the case supply station ST1b comprises a case detector 346 for detecting whether there is a case 38 or not, a case inversion detector 348 for detecting whether a case 38 is vertically inverted or not, and a color difference detector 350 for detecting whether a case 38 is of a desired color or not.

Cases 38 are fed along a case feed path 352 extending from the case supply unit 56 to the encasing unit 42. Supplied cases 38 are laterally pushed, one at a time, from the case feed path 352 to a detecting position near the index table 326 by a pusher 354 disposed near the encasing unit 42.

The case detector 346 has a reflective fiber sensor 356 which is disposed closely to the detecting position. The reflective fiber sensor 356 is horizontally mounted on a vertical portion of an arm 358 in confronting relation to an outer circumferential surface of the upper end of a case 38 that is located in the detecting position. The reflective fiber sensor 356 detects light reflected by the outer circumferential surface of the upper end of the case 38 that is located in the detecting position, for thereby detecting the case 38. The case inversion detector 348 has a reflective fiber sensor 360 directed downwardly and mounted on a horizontal portion of the arm 358. If a case 38 is located in the detecting position with its bottom 38a facing upwardly, then the reflective fiber sensor 360 detects light reflected by the bottom 38a, for thereby determining that the case 38 is vertically inverted in the detecting position. The color difference detector 350 has a color sensor 362 supported on the arm 358 beneath the reflective fiber sensor 356 and facing an outer circumferential surface of a case 38 that is located in the detecting position. The color sensor 362 detects the color of the outer circumferential surface of the case 38.

Figure 18:
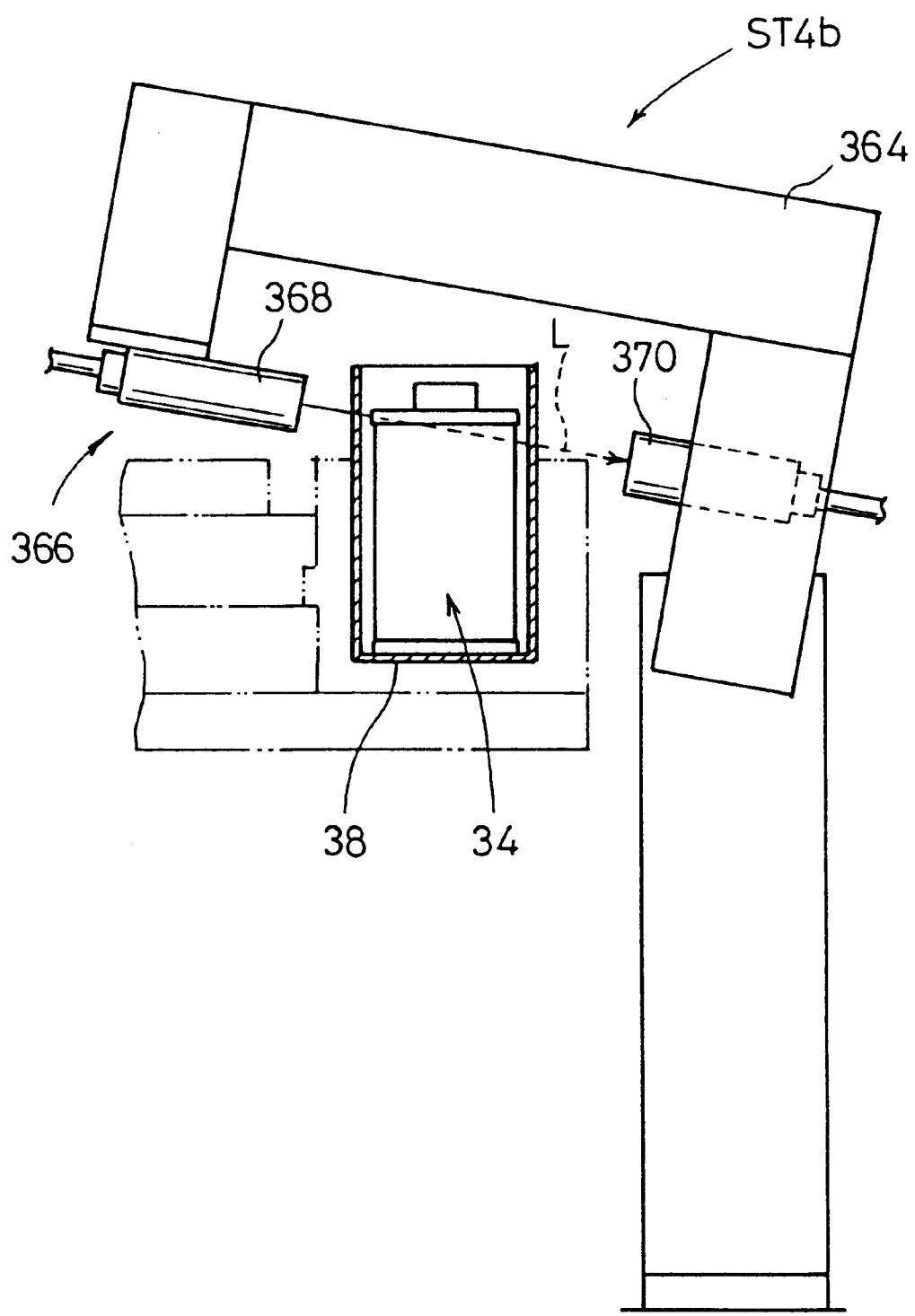
FIG. 18 is a view of a film coil detector.

As shown in FIG. 18, the cartridge detecting station ST4b has a transmissive photosensor 366 mounted on a bracket 364 for detecting whether there is an assembled cartridge 34 or not. The transmissive photosensor 366 comprises a light-emitting element 368 and a light-detecting element 370 and has an optical axis L inclined to the case 38 of an assembled cartridge 34 to be detected.

Figure 19:
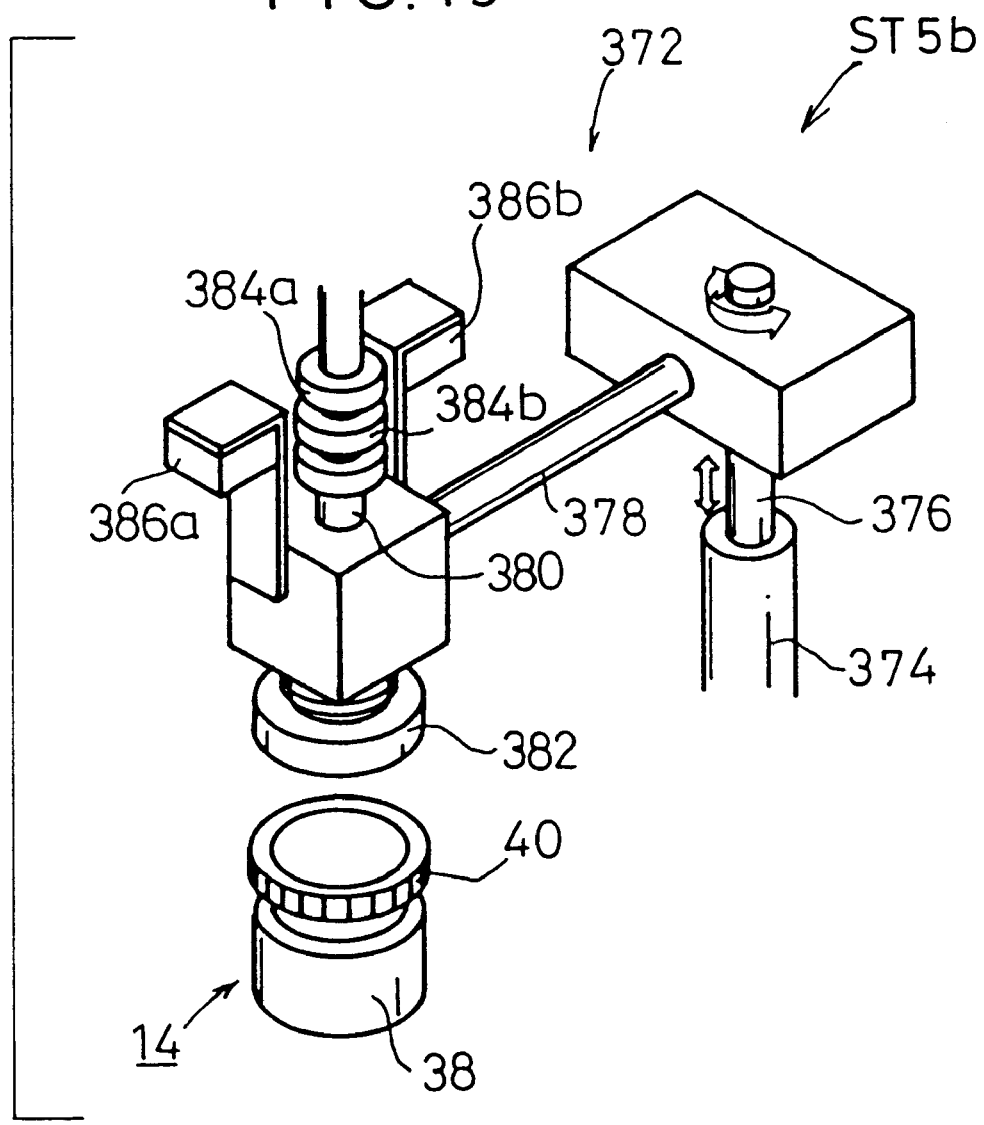
FIG. 19 is a fragmentary perspective view of a case cap defect detector.

As shown in FIG. 19, the case cap inserting station ST5b has a case cap detector 372 for detecting whether a case cap 40 is securely mounted on the open end of a case 38 or not. The case cap detector 372 has a shaft 376 supported in a vertical tubular support 374 and rotatable and vertically movable by an actuating mechanism (not shown). The shaft 376 supports an end of a horizontal support bar 378 on its upper end, and a suction shaft 380 is vertically movably connected to the other end of the horizontal support bar 378. A suction cup 382 is mounted on the lower end of the suction shaft 380. Dogs 384a, 384b are fixed to an upper end portion of the suction shaft 38, and photosensors 386a, 386b are supported on the suction shaft 38 for applying and detecting light between the dogs 384a, 384b.

Figure 20:
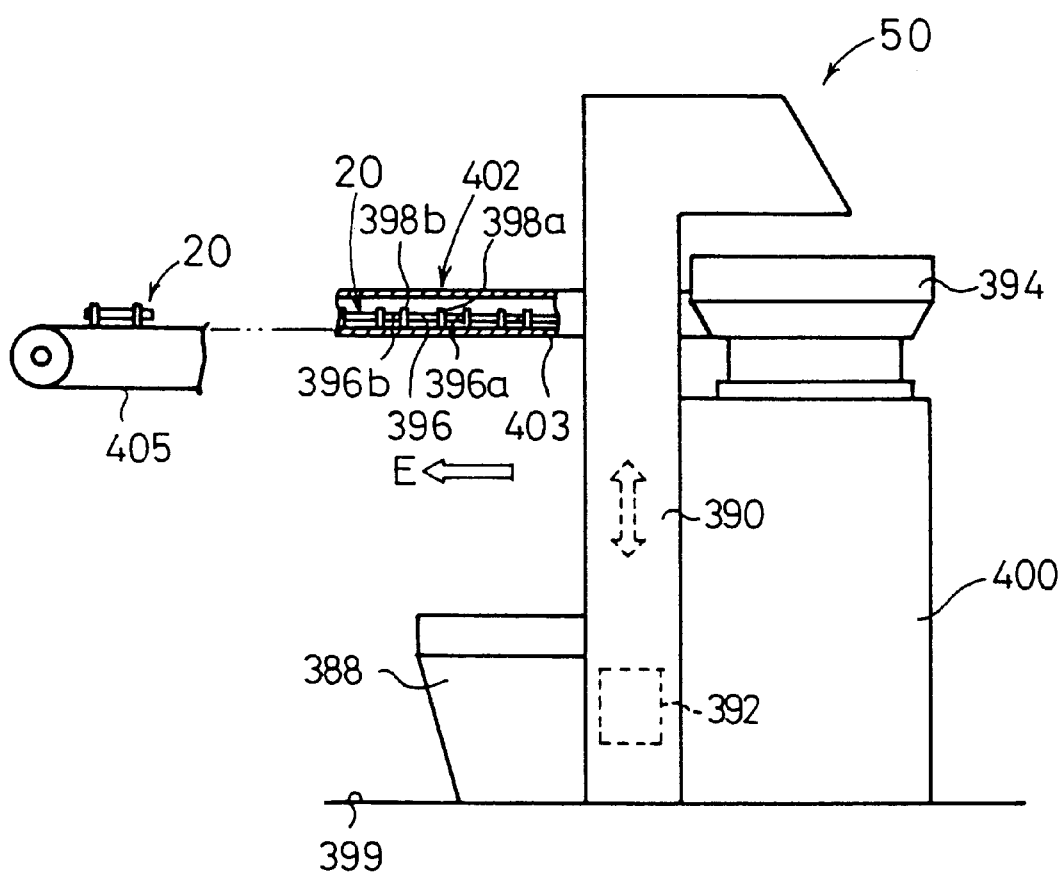
FIG. 20 is a side elevational view of an aligning feeder and a conveyor which accommodate spools.

As shown in FIG. 20, the spool supply unit 50 comprises a hopper 388 for holding a plurality of spools 20 and a parts lifter 390 coupled to the hopper 388. The parts lifter 390 has a vertically movable bucket 392 for supplying a predetermined number of spools 20 from the hopper 388 to an aligning feeder 394. Each spool 20 comprises a shank 396 and a pair of large-diameter flanges 398a, 398b mounted respectively on opposite end portions of the shank 396. A longer end 396a projects axially from an outer end of the large-diameter flange 398a, and a shorter end 396a projects axially from an outer end of the large-diameter flange 398b.

The aligning feeder 394 is mounted on a support base 400 of given height disposed on a floor 399, and is coupled to a horizontal conveyor 402. The conveyor 402 has a horizontal tube 403 connected to an air blower (not shown) for feeding spools 20 through the tube 403 in the direction indicated by the arrow E under air pressure. A belt conveyor 405 is connected to a distal end of the tube 403.

Figure 21:
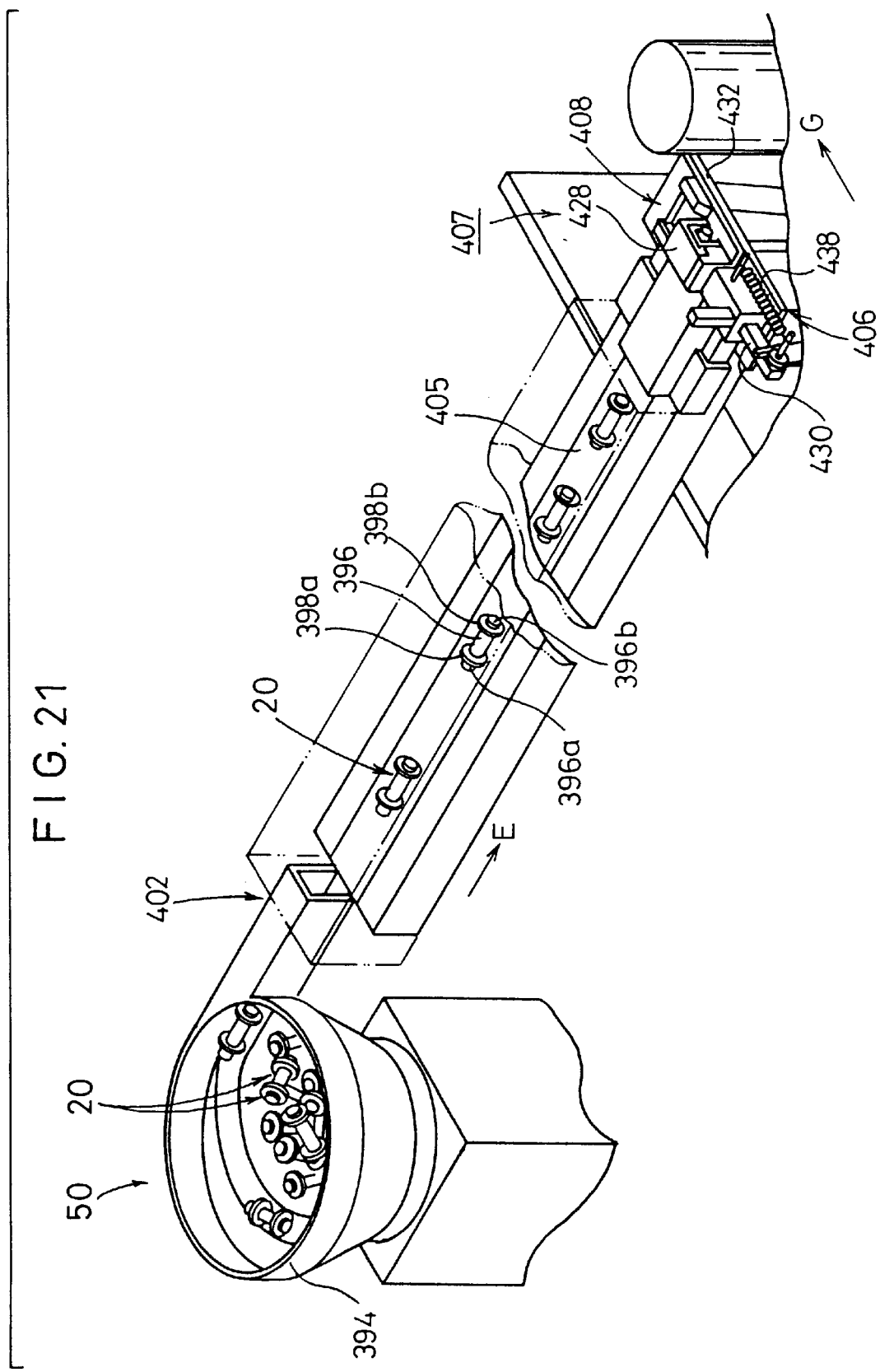
FIG. 21 is a fragmentary perspective view of the aligning feeder and the conveyor.
Figure 22:
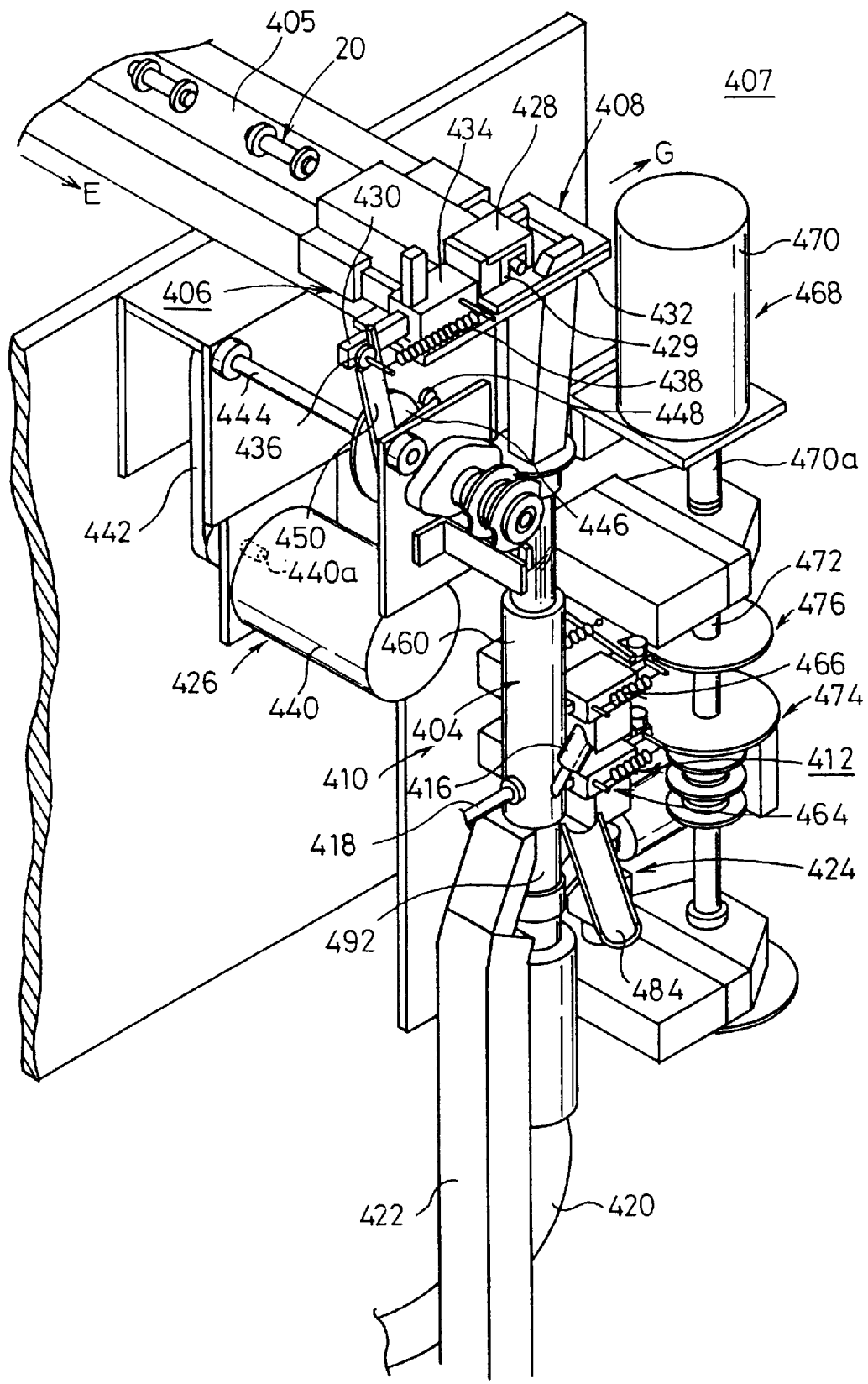
FIG. 22 is a fragmentary perspective view of a defect inspecting unit of the film producing and packaging system.
Figure 23:
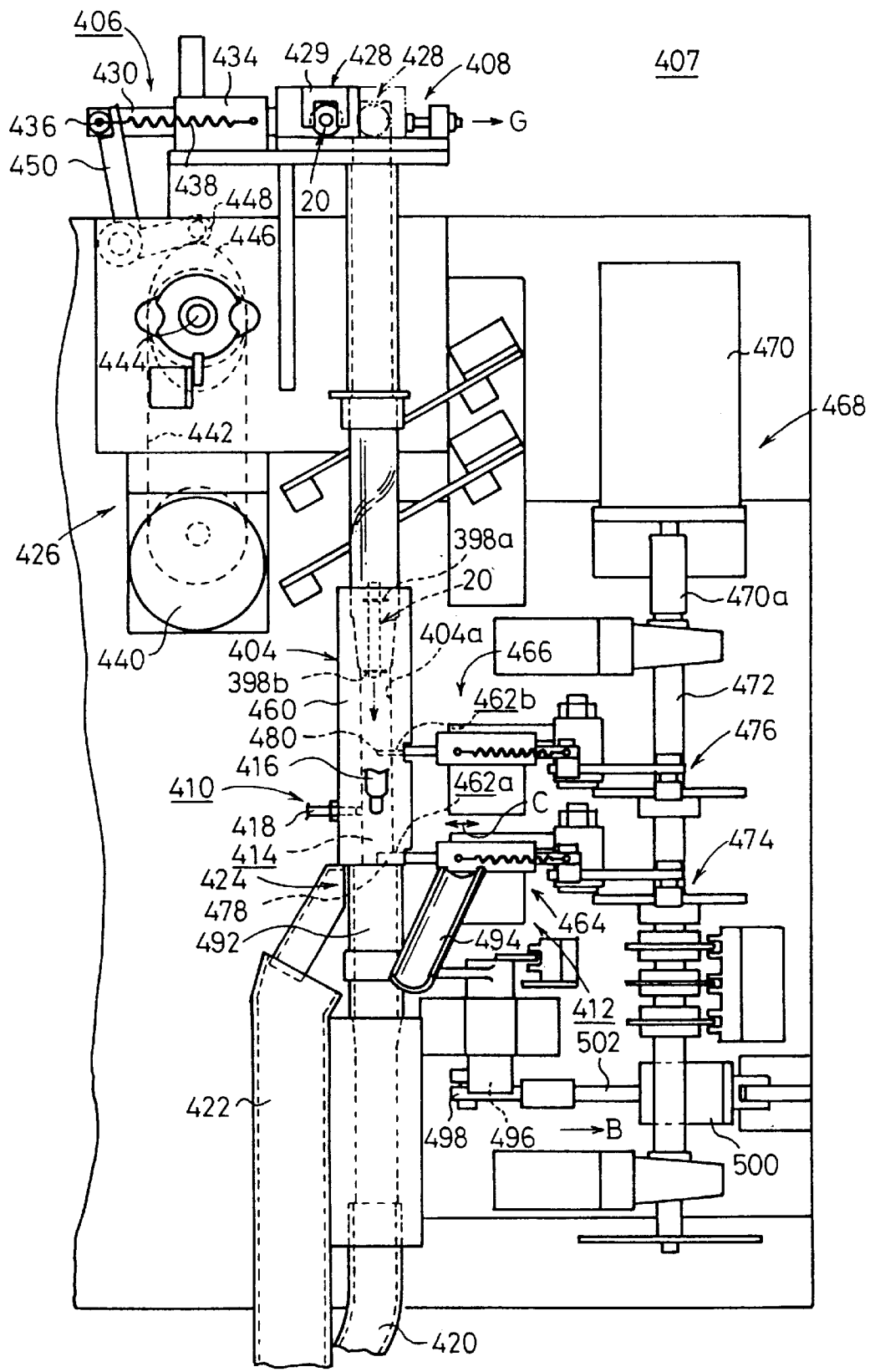
FIG. 23 is a front elevational view of the defect inspecting unit.

As shown in FIGS. 21, 22, and 23, a defect inspecting unit 407 comprises a spool introducing mechanism 406 for transferring each spool 20, which has been fed in the direction indicated by the arrow E by the belt conveyor 405, in the direction indicated by the arrow G transverse to the direction indicated by the arrow E, to a position above a vertical tube 404, a spool orienting mechanism 408 for supplying the spool 20 with one end thereof, e.g., the shorter end 396b, oriented forward into the tube 404, a holder mechanism 412 for holding the spool 20 in an inspecting station (inspecting position) 410 in the tube 404, an air nozzle (fluid supply mechanism) 416 for introducing inspecting air (fluid) into a space 414 defined between the large-diameter flanges 398a, 398b of the spool 20 and an inner wall surface 404a of the tube 404, a pressure sensor (fluid pressure detecting mechanism) 418 for detecting an air pressure in the space 414 thereby to detect whether the large-diameter flanges 398a, 398b suffer a defect or not, and a feed path switching mechanism 424 for automatically switching the spool 20 between a first feed path 420 connected to a next process and a second feed path 422 connected to a discharging position (not shown).

The spool introducing mechanism 406 has a transfer base 428 movable in the direction indicated by the arrow G by a first actuator 426. The transfer base 428 has a holder plate 429 of bent cross sectional shape for holding the large-diameter flange 398a or 398b of the spool 20 fed in the direction indicated by the arrow E, the holder plate 429 being movable with the spool 20 in the direction indicated by the arrow G. A rod 430, which has an end fixed to an end of the transfer base 428, extends slidably through a support 434 fixedly mounted on a base plate 432. On the other end of the rod 430, there is mounted a cam follower 436 having a shaft connected to the support 434 by a tension spring 438. Therefore, the rod 430 is normally urged to move in the direction indicated by the arrow G.

The first actuator 426 comprises a first motor 440 having a rotatable shaft 440a that is operatively coupled to a rotatable shaft 444 by a belt and pulley mechanism 442. The rotatable shaft 444 is rotatably supported on the base plate 432. A substantially elliptical cam 446 is mounted on an end of the rotatable shaft 444. The cam 446 is held in rolling engagement with a swing cam 448 which is supported on an arm 450 engageable with the cam follower 436.

Figure 24:
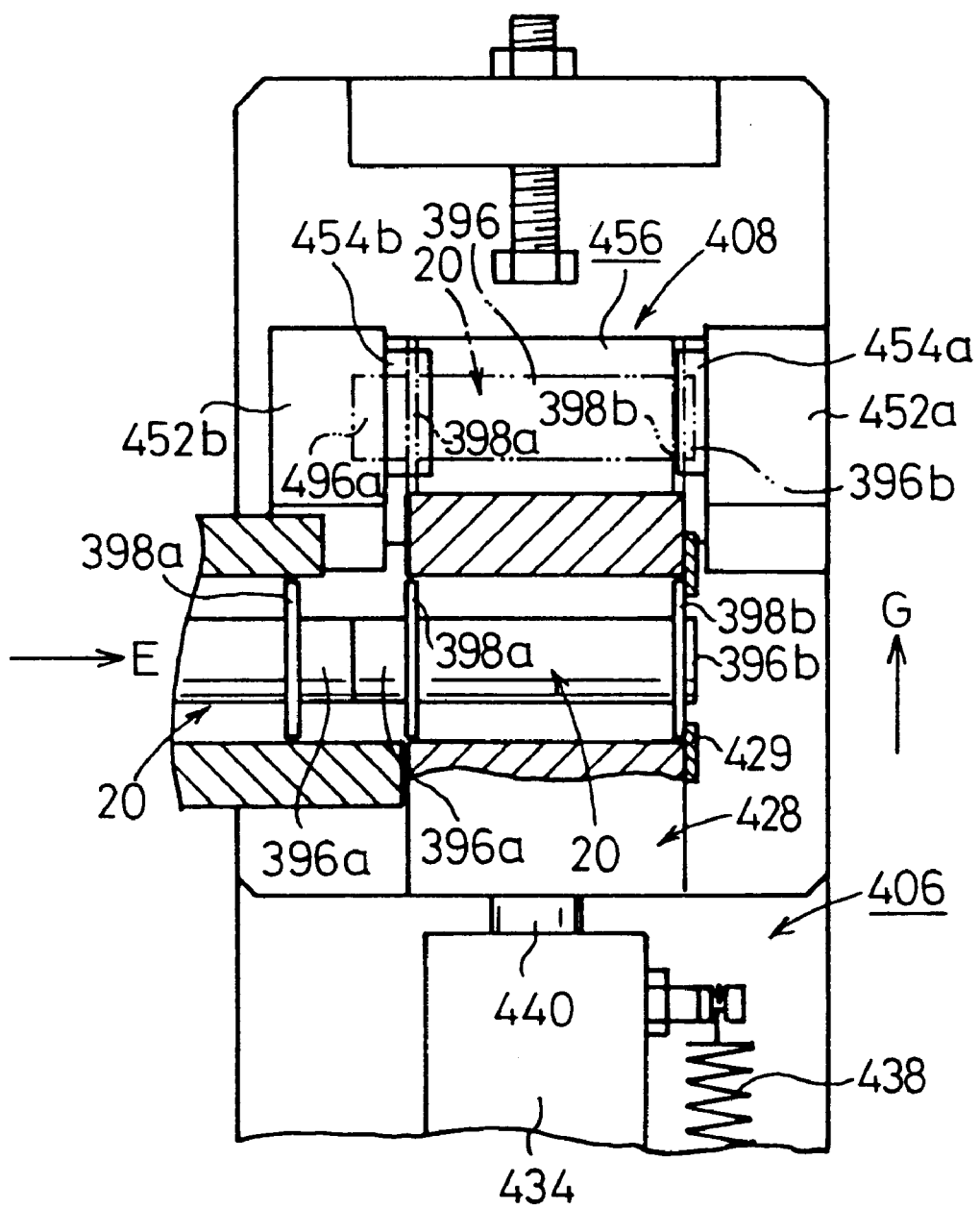
FIG. 24 is a plan view, partly cut away, of a spool introducing mechanism and a spool orienting mechanism of the defect inspecting unit.
Figure 25:
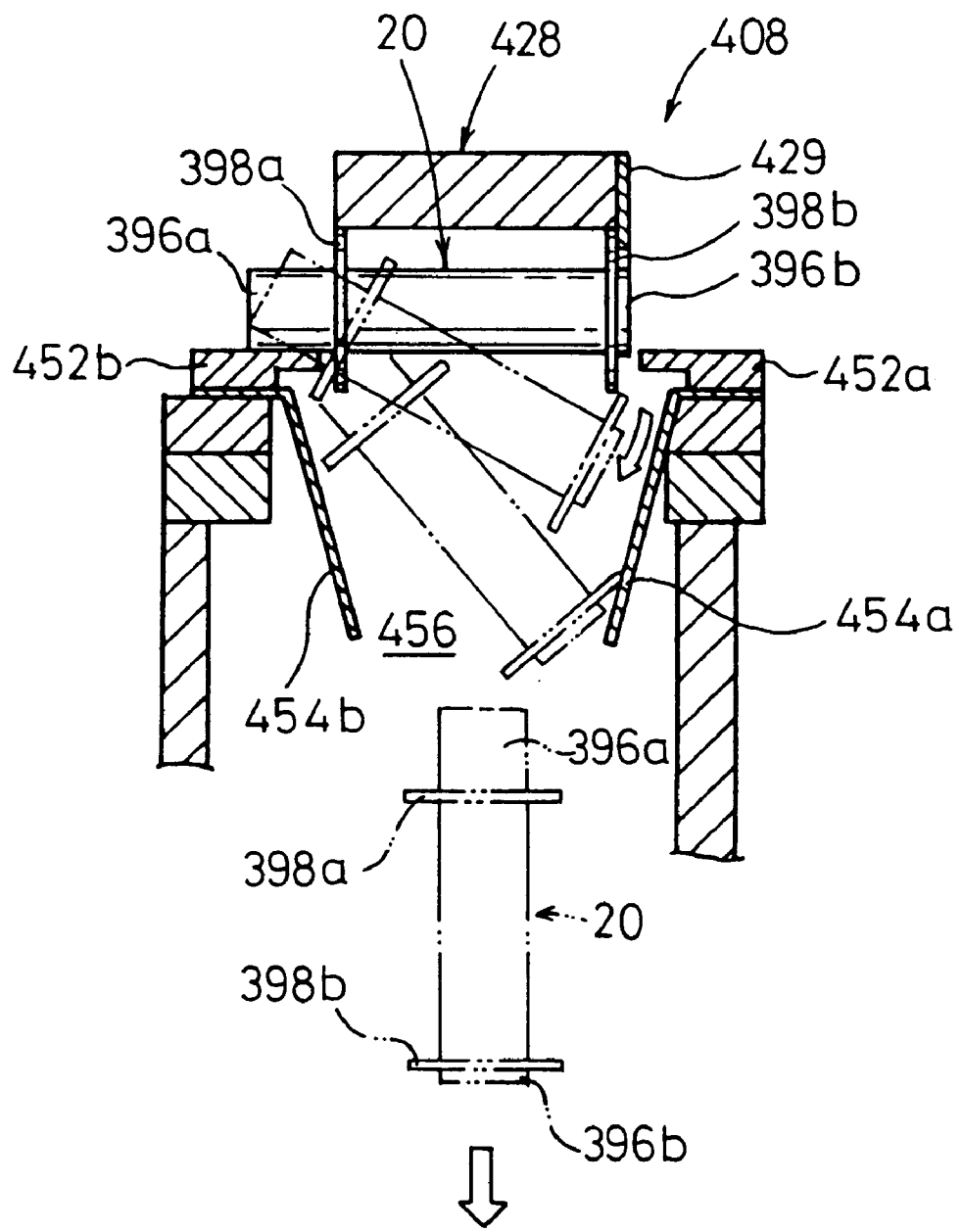
FIG. 25 is a cross-sectional view showing the manner in which the spool orienting mechanism operates.

As shown in FIGS. 24 and 25, the spool orienting mechanism 408 comprises a pair of support bases 452a, 452b spaced from each other for clearing the shorter end 296b of a spool 20 and supporting the longer end 396a thereof, and a pair of guide plates 454a, 454b inclined downwardly from the support bases 452a, 452b, respectively, for guiding the spool 20 into the tube 404. An opening 456 is defined below the support bases 452a, 452b and between the guide plates 454a, 454b and communicates with the tube 404. A spool 20 supplied to the spool orienting mechanism 408 is caused to fall into the opening 456 with the shorter end 296b directed downward because the longer end 296a is supported by either one of the support bases 452a, 452b and hence falls later than the shorter end 296b.

Figure 26:
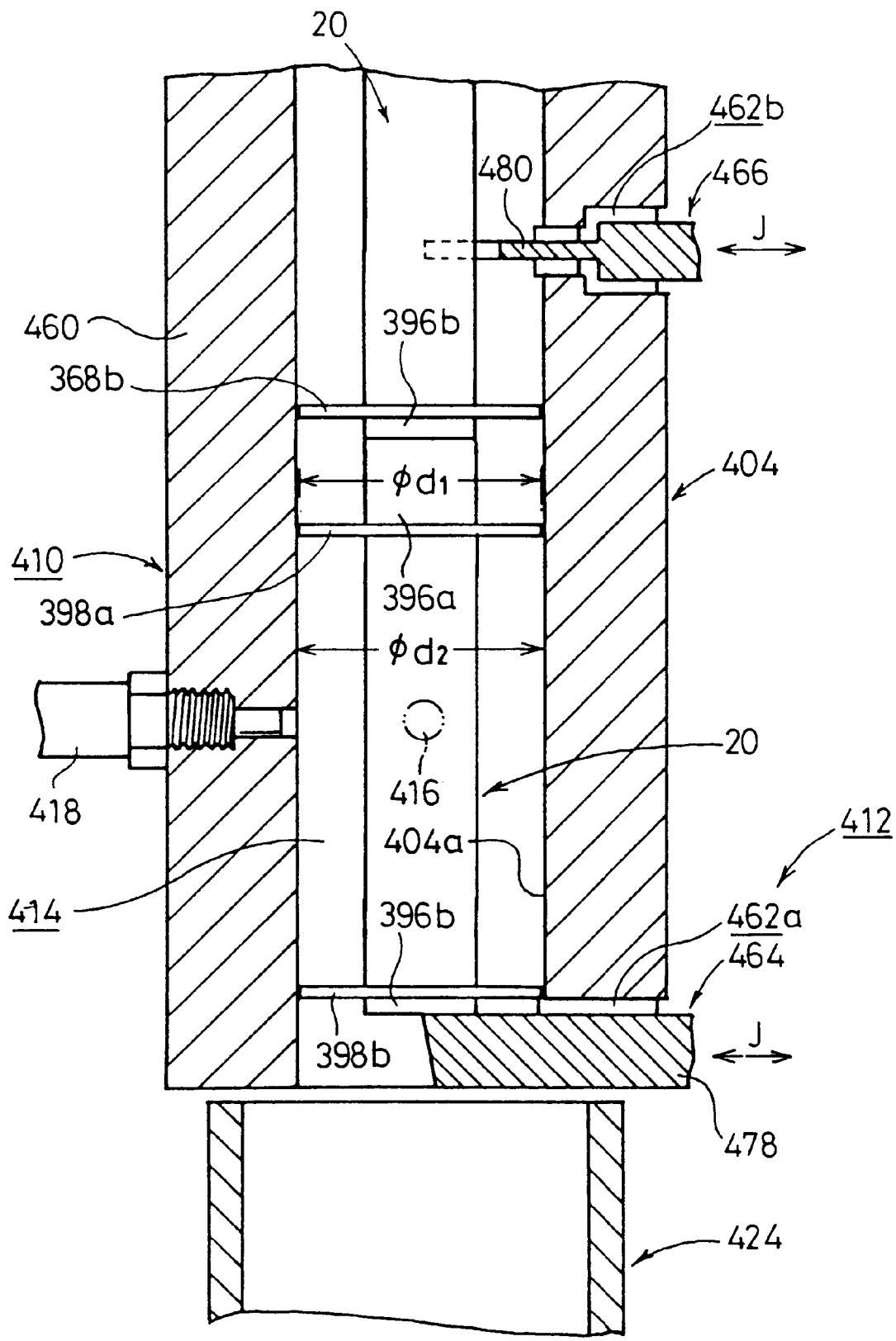
FIG. 26 is a cross-sectional view showing the manner in which a holder mechanism of the defect inspecting unit operates.

As shown in FIGS. 23 and 26, the inspecting station 410 has a block 460 serving as the tube 404 and having upper and lower grooves 462b, 462a defined therein which are vertically spaced from each other by a given distance. As shown in FIG. 26, it is preferable that the large-diameter flanges 398a, 398b of spools 20 have a diameter $d_1$ of 21.80±0.15 mm, the inner wall surface 404a of the tube 404 have an inside diameter $d_2$ ranging from 22.15 mm to 22.55 mm, i.e., the sum of the maximum diameter (21.95 mm) of the large-diameter flanges 398a, 398b and a range from 0.2 mm to 0.6 mm.

The pressure sensor 418 has a resolution of 0.01 (kgf/cm$^2$G), and the air nozzle 416 ejects air under a pressure ranging from 0.5 to 5.0 (kgf/cm$^2$G).

The holder mechanism 412 comprises a first support unit 464 for supporting the shorter end 396b of a spool 20 and a second support unit 466 for holding a spool 20 positioned above the spool 20 which is supported by the first support unit 464. The first and second support units 464, 466 are alternately movable back and forth by a second actuator 468.

The second actuator 468 has a second motor 470 having a drive shaft 470a to which a rotatable shaft 472 is coaxially connected. To the rotatable shaft 472, there are operatively coupled a lower support plate 478 of the first support unit 464 and a U-shaped upper support plate 480 of the second support unit 466 by respective first and second cam units 474, 476. The lower support plate 478 and the upper support plate 480 can be moved back and forth into and out of the tube 404 through the respective grooves 462a, 462b in the directions indicated by the arrow J by the first and second cam units 474, 476.

Figure 27:
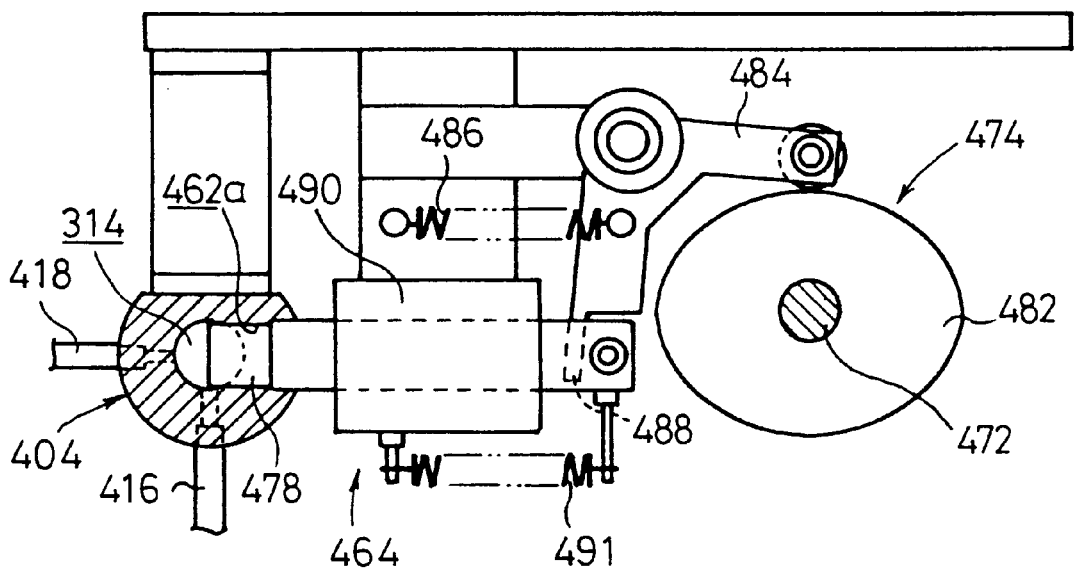
FIG. 27 is a plan view, partly in cross section, of a first support unit and a first cam unit of the holder mechanism.

As shown in FIG. 27, the first cam unit 474 has an elliptical cam 482 mounted on the rotatable shaft 472, and an end of a swing cam 484 is held in rolling contact with the elliptical cam 482. The swing cam 484 is normally urged to contact the elliptical cam 482 by a spring 486. The swing cam 484 has a finger 488 on the other end thereof which can engage the lower support plate 478, which is reciprocally movably supported by a slide guide 490. The lower support plate 478 is normally urged to move toward the tube 404 by a spring 491 connected between the slide guide 490 and the lower support plate 478.

The second cam unit 476 is structurally identical to the first cam unit 474, and will not be described in detail below.

The air nozzle 416 and the pressure sensor 418 (see FIG. 23) is mounted on the block 460 between the lower support plate 478 and the upper support plate 480.

Figure 28:
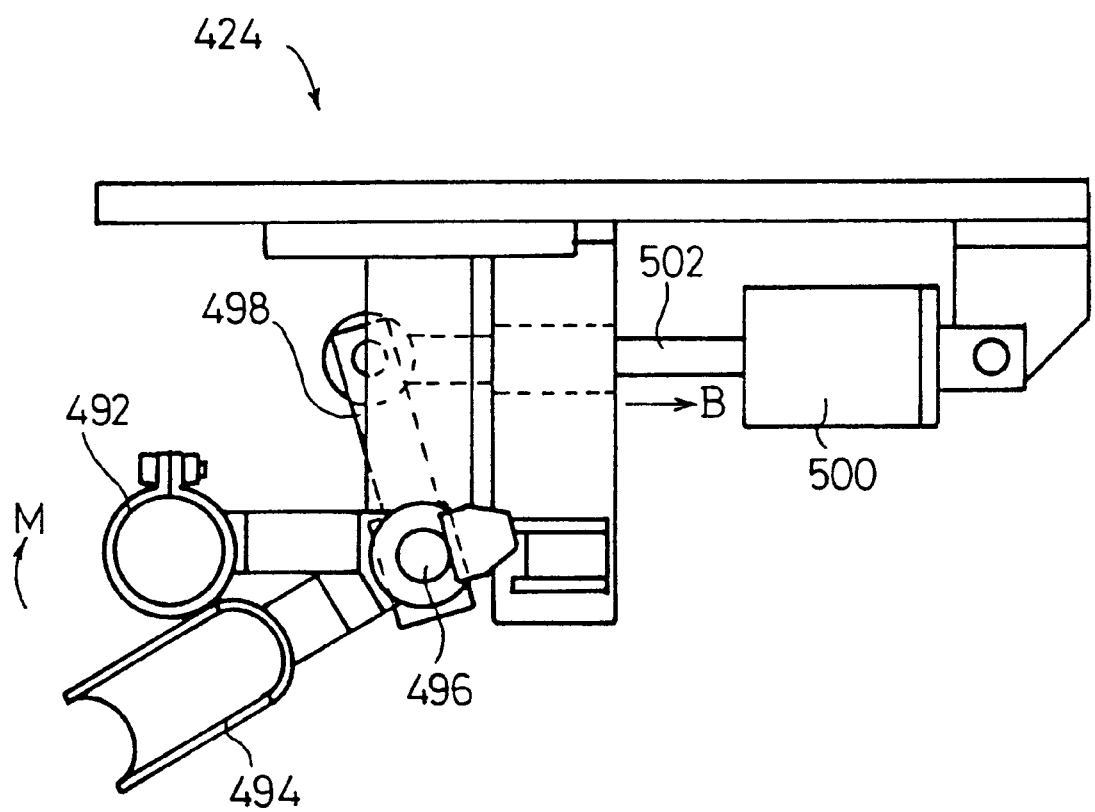
FIG. 28 is a plan view of a feed path switching mechanism of the defect inspecting unit.

As shown in FIGS. 23 and 28, the feed path switching mechanism 424 has a first tube 492 communicating with the first feed path 420 and a second tube 494 communicating with the second feed path 422. The first and second tubes 492, 494 are coupled to a shaft 496. A rod 502 of a cylinder 500 is connected to the shaft 496 by an arm 498. The first feed path 420 extends to the film coiling unit 22, and the second feed path 422 extends to a discharge position (not shown).

Figure 29:
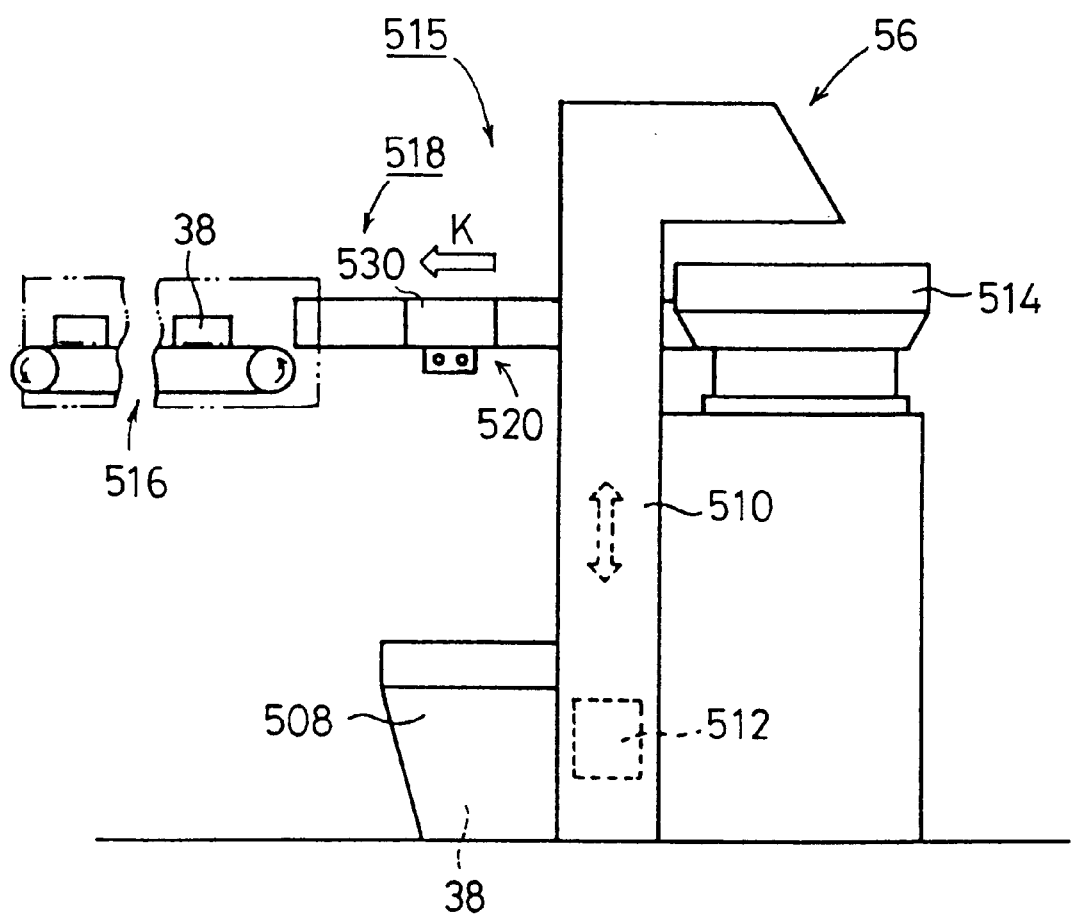
FIG. 29 is a side elevational view of a discharging device and a case supply unit of the film producing and packaging system.

As shown in FIG. 29, the case supply unit 56 has a hopper 508 for holding a plurality of cases 38 and a parts lifter 510 coupled to the hopper 508. The parts lifter 510 has a vertically movable bucket 512 for supplying a predetermined number of cases 38 from the hopper 508 to an aligning feeder 514 (see also FIG. 30).

Figure 30:
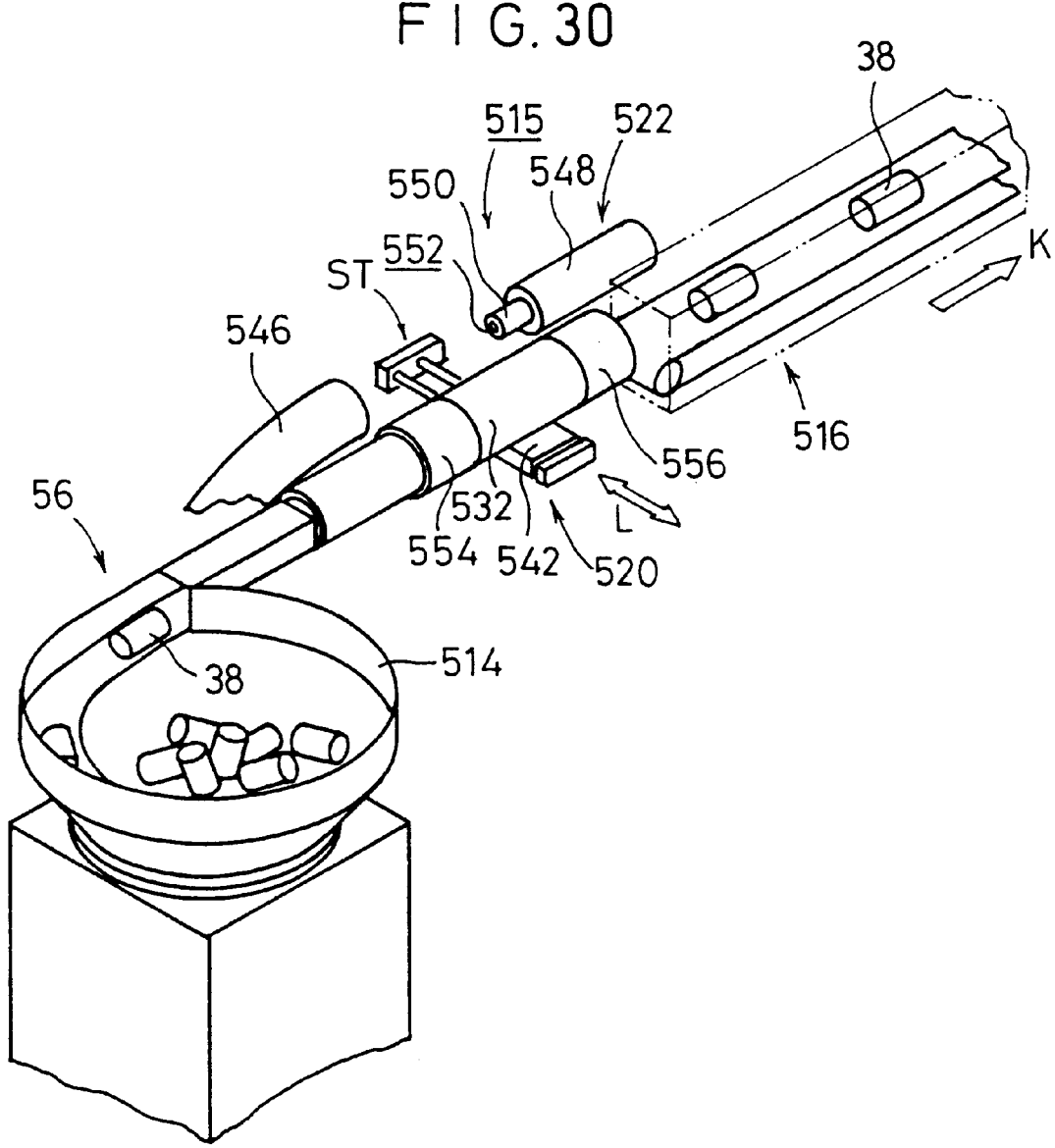
FIG. 30 is a fragmentary perspective view of the discharging device and the case supply unit.
Figure 31:
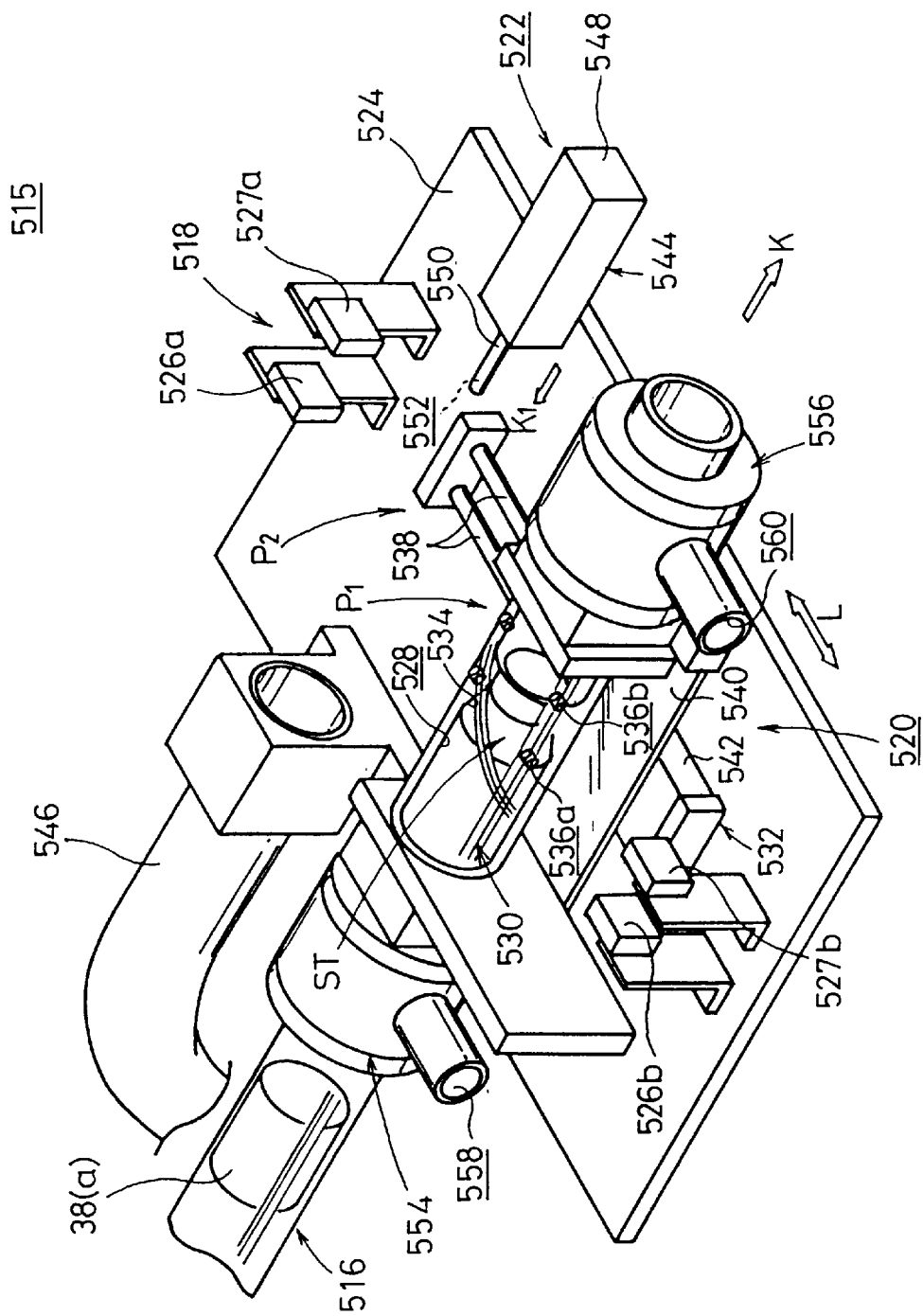
FIG. 31 is a perspective view of the discharging device.
Figure 32:
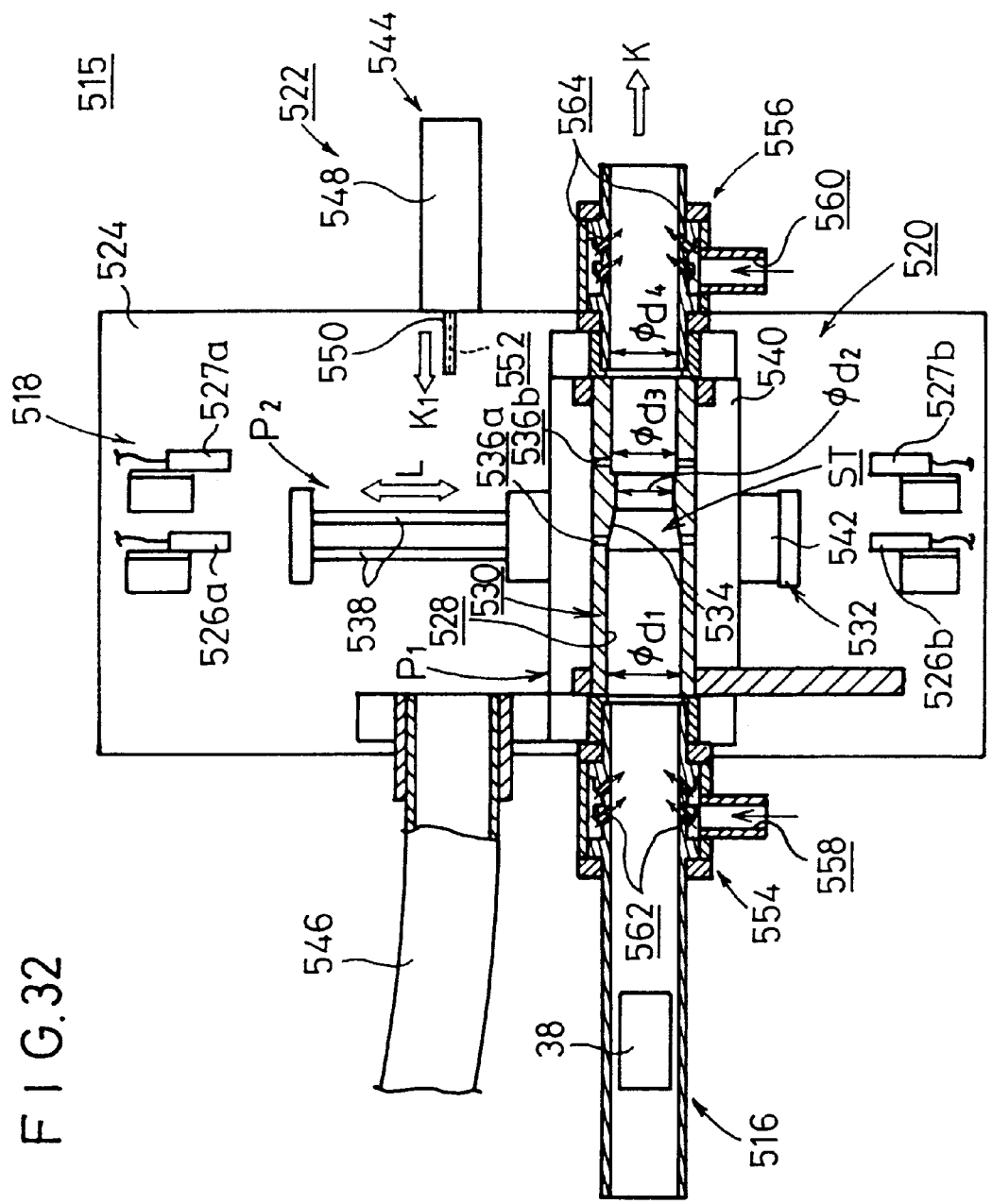
FIG. 32 is a plan view, partly in cross section, of the discharging device.

As shown in FIGS. 30, 31, and 32, a discharging device 515 for discharging deformed parts comprises a detecting station ST in a feed path 516 extending from the aligning feeder 514 to the encasing unit 42, a detecting mechanism 518 for detecting whether a case 38 has remained in the detecting station ST for more than a predetermined period of time or not, a removing mechanism 520 for automatically removing a case 38 as a deformed case 38a from the feed path 516 if the case 38 has remained in the detecting station ST for more than the predetermined period of time, and a transfer mechanism 522 for transferring the deformed case 38a to a discharge unit (not shown).

The detecting mechanism 518 has two pairs of transmissive photosensors 526a, 526b and 527a, 527b vertically mounted on a base plate 524 and disposed in confronting relation to each other in the directions indicated by the arrow L transverse to the direction indicated by the arrow K in which cases 38 are fed. The transmissive photosensors 526a, 526b and 527a, 527b may be replaced with reflective photosensors.

The removing mechanism 520 comprises a passage member 530 having a through passage 528 as part of the feed path 516 and a displacing unit 532 for displacing the passage member 530 out of the feed path 516. The passage member 530 comprises a tubular member and should preferably be made of a light-transmissive synthetic resin for making the inside of the passage member 530 visible.

The through hole 528 is defined centrally in the passage member 530. The inner wall surface which defines the through hole 528 has a deformed case engaging surface 534 positioned in alignment with the detecting mechanism 518 and tapered in the direction in which cases 38 are fed. The through hole 528 includes an inlet region having a diameter $d_1$ upstream of the tapered deformed case engaging surface 534, and the tapered deformed case engaging surface 534 has an exist region having a diameter $d_2$. The through hole 528 also includes an outlet region having a diameter $d_3$ downstream of the exist region of the tapered deformed case engaging surface 534. In this embodiment, cases 38 have an outside diameter of 31 mm, and the diameters $d_1$, $d_2$, $d_3$ are of 40 mm, 31.9 mm, and 34 mm, respectively. A second tube 556 (described later on) has a diameter $d_4$ of 37 mm. The passage member 530 has axially spaced transverse through holes 536a, 536b defined in its cylindrical wall in alignment with the optical axes of the transmissive photosensors 526a, 526b and 527a, 527b.

Figure 33:
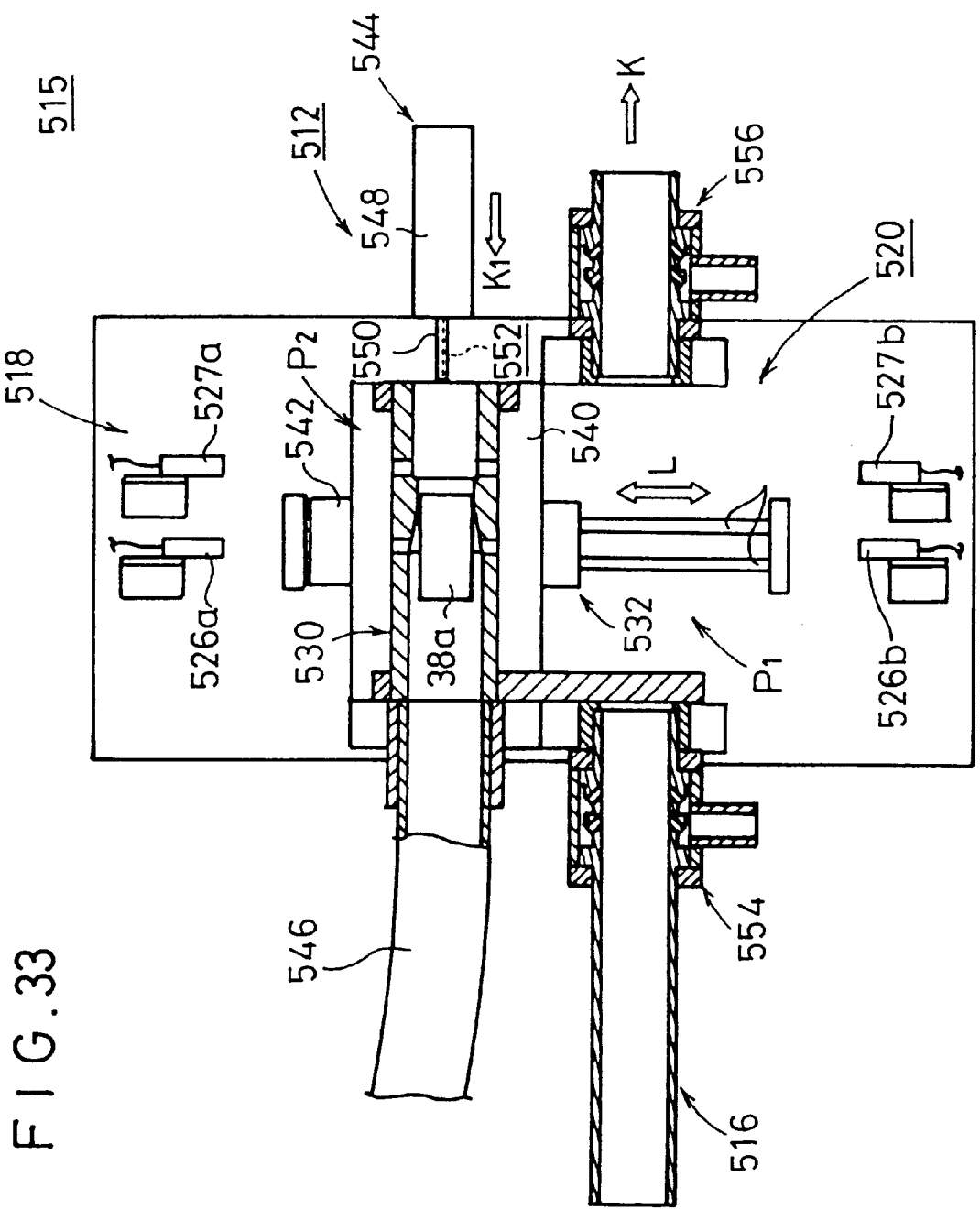
FIG. 33 is a plan view, partly in cross section, showing the manner in which a deformed part is discharged by the discharging device.

The displacing unit 532 has a movable base 540 supporting the passage member 530 thereon and movable back and forth along a pair of guide rails 538 mounted on the base plate 524 and extending in the directions indicated by the arrow L. A movable cylinder 542 is mounted on the movable base 540. When the cylinder 542 is operated, the passage member 530 can move between a feed position P1 (see FIG. 31) aligned with the feed path 516 and a removal position P2 (see FIG. 33) out of the feed path 516.

As shown in FIGS. 31 and 32, the transfer mechanism 522 comprises a pusher unit 544 disposed in alignment with the removal position P2 for pushing a deformed case 38a from the passage member 530, and a discharge tube 546 for guiding the deformed case 38a pushed from the passage member 530 by the pusher unit 544 to a discharging unit (not shown). The pusher unit 544 comprises a pusher rod 550 movable by a cylinder (actuator) 548 for engagement with the deformed case 38a in the passage member 530, and an air passageway 552 defined axially in the pusher rod 550 for ejecting air against the deformed case 38a in the passage member 530.

On the base plate 524, there are fixedly mounted first and second tubes 554, 556 positioned at respective axially opposite ends of the passage member 530 and serving as the feed path 516. The first and second tubes 554, 556 have respective radial air inlet ports 558, 560 held in communication with a plurality of nozzles holes 562, 564 defined in cylindrical walls of the first and second tubes 554, 556 and inclined toward the inside of the first and second tubes 554, 556 in the direction indicated by the arrow K.

Each of the cap supply unit 52 and the case cap supply unit 54 is identical in structure to the case supply unit 56. The cap supply unit 52 and the case cap supply unit 54 are connected to the assembling unit 36 and the encasing unit 42 by respective parts feeders 514a, 514b (see FIG. 2).

As shown in FIG. 2, the film producing and packaging system 10 is controlled by an in-factory network including a computer 570. The film producing and packaging system 10 is divided into a plurality of blocks that are individually controlled by respective computers under the control of the computer 570.

Operation of the film producing and packaging system 10 will be described below.

As shown in FIGS. 4 and 5, the feeder 70 in the film supply unit 18 is operated to rotate the film roll 14 clockwise in the direction indicated by the arrow to deliver the leading end of the unreeled new elongate film F to the splicer 72. As shown in FIG. 4, the trailing end of the preceding elongate film F has been attracted to the splicing base 82 of the splicer 72, and the leading end of the new elongate film F supplied from the feeder 70 is attracted to the auxiliary base 84.

After the splicing tape 86 is wound around the application base 88, the cylinder 99 is actuated to lower the application base 88 and the tape cutter 92. The splicing tape 86 is now applied to the trailing end of the elongate film F on the splicing base 82 across a certain width. Then, the trailing end of the elongate film F is superimposed on and applied to the leading end of the new elongate film F attracted to the auxiliary base 84, with the splicing tape 86 interposed therebetween.

After the above splicing process, the elongate film F is fed to the perforator 76. In the perforator 76, the suction chambers 96, 98 are evacuated to attract an upstream portion of the elongate film F between the feed roller 102 and the path roller 110, and also to attract a downstream portion of the elongate film F between the sprocket roller 104 and the path roller 106. The elongate film F is given a predetermined tension between the sprocket roller 104 and the feed roller 102. When the punch block 94 is vertically moved, perforations 74 are formed in opposite sides of the elongate film F by the punch block 94 in coaction with the die block 93.

Then, the feed roller 102 and the sprocket roller 104 are intermittently rotated by an indexing device (not shown) to feed the elongate film F intermittently. Thereafter, the punch block 94 is vertically moved to form perforations 74 in opposite sides of the elongate film F in coaction with the die block 93. The above perforating cycle is repeated to form a succession of perforations in opposite sides of the elongate film F at a constant pitch (see FIG. 1).

The perforated elongate film F is fed to the side printer 78 where latent images of strip-like prints depending on the film type are formed on one or both sides of the elongate film F by the first printing mechanism 112. The printed elongate film F forms a free loop between the path roller 110 and the sprocket 114, after which the second printing mechanism 116 above the sprocket 114 records a DX bar code, frame numbers, frame number bar codes, a commercial name, depending on the film size as latent images on one or both sides of elongate films F. In the side printer 78, the film floating detector 115 detects whether the elongate film F is floating from the path roller 110 or not, and the light emission detector 117 detects whether the first printing mechanism 112 emits light or not. If the elongate film F is floating from the path roller 110, then latent images printed on the elongate film F are blurred, and if the first printing mechanism 112 emits no light, then desired latent images are printed on the elongate film F.

If the elongate film F is judged as defective by the film floating detector 115 or the light emission detector 117, then the elongate film F is discharged from the discharge receptacle 136 into the accumulation chamber 142. If the defective elongate film F cannot timely be discharged into the discharge receptacle 136, then the defective elongate film F will be discharged from the discharge chute 204 along the second transfer unit 190.

The elongate film F which has passed through the side printer 78 is fed through the film position detector 150, the full length detector 152, and the splicing detector 154. When the elongate film F is positioned in the cutter 80, the first and second light-emitting elements 156a, 158a emit respective rays of infrared radiation. If the emitted rays of infrared radiation pass through perforations 74 in the elongate film F and are detected by the first and second light-detecting elements 156b, 158b. The first and second light-detecting elements 156b, 158b apply respective ON signals to the decision unit 161. The decision unit 161 now determines that any perforations 74 do not lie across the end face 159.

If at least one of the emitted rays of infrared radiation from the first and second light-emitting elements 156a, 158a is blocked by the elongate film F, then first and second light-detecting elements 156b, 158b apply respective ON and OFF signals, respective OFF and ON signals, or respective OFF signals to the decision unit 161. The decision unit 161 now determines that at least one perforation 74 lies across the end face 159, and rejects the elongate film F as thus positioned (NG).

The full length detector 152 counts perforations 74 in the elongate film F to detect the full length of a sized film 16 severed from the elongate film F. The splicing detector 154 detects the splicing tape 86 on the elongate film F.

The elongate film F with the splicing tape 86 detected is discharged, for a predetermined number of film lengths following the splicing tape 86, from the discharge receptacle 136 into the accumulation chamber 142. The elongate film F which has not been set to a predetermined dimension is similarly discharged from the discharge receptacle 136.

The elongate film F is fed to the cutter 80 where the elongate film F is cut to a predetermined length by the movable blade 118 and the fixed blade 120, producing a sized film 16. When the elongate film F is thus cut off, the trailing end 16c of the sized film 16 which has been severed and the leading end 16a of a sized film 16 to be produced next time are processed. At the same time that the leading end 16a of the sized film 16 to be produced next time is processed, holes for engaging a spool are also formed in the leading end 16a.

In the film coiling unit 22, as shown in FIGS. 5 and 8, a spool 20 is supplied to the spool chuck 174 in the spool supply station ST1 on the turntable 172. Then, the main shaft 170 is intermittently rotated clockwise in the direction indicated by the arrow, moving the spook chuck 174 which holds the spool 20 to the spool positioning station ST2. In the spool positioning station ST2, the spool positioner 176 is pressed by the spool 20, positioning the spool 20.

Further rotation of the turntable 172 in the direction indicated by the arrow brings the spool 20 into the inserting station ST3. The sized film 16 is fed to the turntable 172 until its leading end 16a is inserted into the groove of the spool 20. The guide plate 132 is opened, allowing the trailing end 16c of the sized film 16 to fall onto the film guide 184 (see FIG. 5).

In response to continued rotation of the turntable 172, the spool chuck 174 which holds the spool 20 reaches the prewinding station ST4. As shown in FIG. 8, the prewinder 180 is operated to move a touch roller (not shown) into contact with the spool chuck 174, for thereby rotating the spool 20 in the direction indicated by the arrow. The sized film 16 whose leading end 16a engages the spool 20 is now prewound on the spool 20 to a predetermined length. As shown in FIG. 5, when the trailing end 16c of the sized film 16 passes the first photosensor 186a, the touch roller is decelerated, and when the trailing end 16c of the sized film 16 is detected by the second photosensor 186b, the spool 20 is stopped against rotation.

The turntable 172 is further rotated to move the spool chuck 174 which holds the spool 20 with the prewound film 16 to the winding station ST5. In the winding station ST5, as shown in FIG. 9, the winding length abnormality detector 185 is operated. Since the sized film 16 is prewound, the predetermined length thereof extends in the guide 187, and infrared radiation emitted from the light-emitting element 189a is blocked by the sized film 16 and does not reach the light-detecting element 189b.

Therefore, if an OFF signal is generated by the light-detecting element 189b before the sized film 16 starts being wound by the winder 182, then the sized film 16 is judged as being in a predetermined prewound state. If infrared radiation emitted from the light-emitting element 189a is applied to the light-detecting element 189b and an ON signal is generated by the light-detecting element 189b, then the sized film 16 is judged as being excessively prewound and shorter than required, or as being not properly introduced in the guide 187, and is rejected (NG), as shown in Table 1 below.

TABLE 1

| Timing | Photosensor | Judgment |
|---|---|---|
| Before winding | ON | NG |
|  | OFF | OK |
| After winding | ON | NG |
|  | OFF | OK |

Then, the winder 182 is operated to wind the sized film 16 on the spool 20, producing a film coil 32. At this time, the winding length abnormality detector 185 is energized again. If the sized film 16 is properly wound on the spool 20, infrared radiation emitted from the light-emitting element 189a is applied to the light-detecting element 189b and an ON signal is generated by the light-detecting element 189b, then the film coil 32 is judged as accepted. If infrared radiation emitted from the light-emitting element 189a is blocked by the sized film 16 and an OFF signal is generated by the light-detecting element 189b, then the sized film 16 wound on the spool 20 is detected as longer than a predetermined wound state, and judged as being defective.

The film coil 32 is held by the holder 194 of the first transfer unit 188, and then angularly moved 90° from a horizontal attitude to a vertical attitude when the holder 194 turns 180°. The film coil 32 in the vertical attitude is gripped by the grips 200 of the second transfer unit 190. In the second transfer unit 190, the turntable 198 rotates in unison with the vertical rotatable shaft 196, bringing the film coil 32 gripped in the vertical attitude by the grips 200 to a standby position above the chuck 308 placed in the film-wound spool inserting station ST3a on the index table 202 of the assembling unit 36. A single-one-ended cartridge 28 is placed in the chuck 208.

A sized film 16 which has been judged as defective by the film floating detector 115 or the light emission detector 117 and delivered to the film coiling unit 22, rather than being discharged from the discharge receptacle 136, and a film coil 32a which has been judged as defective by the winding length abnormality detector 185 are discharged into the discharge chute 204 (see FIG. 10).

In the cartridge producing unit 30, as shown in FIG. 14, cartridge blank sheets 24 are successively delivered onto the inclined conveyor 314 by the cartridge blank sheet removal mechanism 312. The inclined conveyor 314 feeds the cartridge blank sheets 24 successively to the rounding index disk 300, which rounds the supplied cartridge blank sheets 24 successively. The rounding index disk 300 is also supplied with a succession of caps 26a from the cap supply unit 59, and fits the caps 26a successively into ends of the rounded cartridge blank sheets 24. The caps 26a are then staked or crimped, thus producing single-open-ended cartridges 28.

After a single-open-ended cartridge 28 has been delivered from the rounding index disk 300 into the oblique feed path 302, the single-open-ended cartridge 28 is fed through the first feed path 46 to the assembling unit 36. As shown in FIG. 10, the single-open-ended cartridge 28 is transferred by the loading unit 210 to the single-open-ended cartridge supply station ST1a on the index table 202. The index table 202 is intermittently rotated in the direction indicated by the arrow to move the single-open-ended cartridge 28 from the single-open-ended cartridge supply station ST1a to the film-wound spool inserting station ST3a, in which the film coil 32 is inserted into the single-open-ended cartridge 28 by the second transfer unit 190.

The single-open-ended cartridge 28 with the film coil 32 inserted therein is checked in the single-open-ended cartridge detecting station ST2a to detect where there is a trailing end 16c of a sized film 16 or not. Thereafter, the single-open-ended cartridge 28 with the film coil 32 inserted therein is fed to the spool detecting and chuck opening station ST4a. In the spool detecting and chuck opening station ST4a, as shown in FIG. 11, the tongue detector 218 is operated.

Specifically, the block 220 is lowered, guiding the trailing end 16c of the sized film 16 between the guide plates 222a, 222b. Then, the photosensors 228a, 228b are energized to apply rays of infrared radiation to the trailing end 16c. If the trailing end 16c is positioned in the range of the distance H between the photosensors 228a, 228b, i.e., if an OFF signal is generated by at least the photosensor 228b, then the film coil 32 is judged as being properly inserted in the single-open-ended cartridge 28. In the spool detecting and chuck opening station ST4a, it is detected whether there is a spool 20 or not and also whether the chuck 208 is closed or not.

The single-open-ended cartridge 28 is delivered to the cap supply station ST5a. In the cap supply station ST5a, a cap 26b delivered by the cap feed unit 212 is positioned in an upper open end of the single-open-ended cartridge 28. In the cap crimping station ST7a, the cap 26b is pressed into the upper open end of the single-open-ended cartridge 28 by the pressing unit 214 and crimped in place, producing an assembled cartridge 34.

The assembled cartridge 34 is then fed to the cap height and torque detecting station ST9a. In the cap height and torque detecting station ST9a, the cap detector 230, the height detector 232, and the torque detector 234 are simultaneously operated.

As shown in FIGS. 12 and 13, the rod 236 is lowered by the cam mechanism (not shown) until the dog 240 on the lower end of the rod 236 engages and holds the assembled cartridge 34. The proximity sensor 242 of the cap detector 230, which is embedded in the dog 240, detects whether there is a cap 26b on the assembled cartridge 34 or not.

The distance T between the height detecting bar 244 and the fixed block 246 is detected by the reflective photosensor 248 of the height detector 232. If the height of the cap 26b is greater than a predetermined value due, for example, to a crimping failure of the cap 26b, then the distance T detected by the photosensor 248 differs from an reference value, so that a crimping failure of the cap 26b can be detected.

With the assembled cartridge 34 held by the dog 240, the grips 286a, 286b of the torque detector 234 grip the training end 16c of the sized film 16 projecting from the assembled cartridge 34. Then, when the movable bracket 250 is moved in the direction indicated by the arrow D by the cam mechanism (not shown), the hand 254 movably supported on the movable bracket 250 moves along the rail 252 in the direction indicated by the arrow D, tending to pull the trailing end 16c. Because a resistance to the pull is imposed on the hand 254 by the trailing end 16c, the hand 254 is displaced relatively to the movable bracket 250. The load cell 288 coupled to the hand 254 detects the resistance imposed by the trailing end 16c. If the detected resistance is 250 gf or less, then the assembled cartridge 34 is determined as being accepted.

The assembled cartridge 34 is fed to the tongue length detecting station ST10a. In the tongue length detecting station ST10a, the tongue detector which is similar to the tongue detector 218 shown in FIG. 11 detects whether the projecting length of the trailing end 16c falls in a predetermined range after the resistance imposed by the trailing end 16c has been inspected.

The above detected results are transmitted through the computer dedicated to the assembling unit 36 to the computer 570 and stored in the computer 570. Each assembled cartridge 34 carries information indicative of whether it is accepted or not based on the detected results, and is delivered to the second feed path 48 by the unloading unit 216.

The second feed path 48 extends from the dark room 44 into the bright room 45. As shown in FIGS. 15 and 16, the assembled cartridge 34 is fed toward a terminal end of the second feed path 48, i.e., toward the encasing unit 42, while being shielded from light by the light-shield cover 322.

In the encasing unit 42, a case 38 is delivered to the index table 326 at the case supply station ST1b, and then the index table 326 is intermittently rotated clockwise in the direction indicated by the arrow to bring the case 38 cartridge inserting station ST3b. When an assembled cartridge 34 fed along the second feed path 48 is positioned at an removal opening 322a defined in the light-shield cover 322, the assembled cartridge 34 is sorted out according to the information carried thereby which indicates whether the assembled cartridge 34 is accepted or not.

Specifically, if an assembled cartridge 34a is judged as rejected based on the results of the above various inspection processes carried out in the assembling unit 36, then the rejected assembled cartridge 34a is not delivered to the encasing unit 42, but is discharged into the discharge chute 324. If an assembled cartridge 34 is judged as accepted, then it is transferred from the second feed path 48 to the intermediate position 332 by the cartridge loading unit 328.

In the intermediate position 332, with the trailing end 16c forcibly held by the guide plate 336, the bar-code reader 338 of the bar-code reading unit 334 reads a bar code (not shown) printed on the outer surface of the assembled cartridge 34 thereby to confirm the type of the assembled cartridge 34. If the assembled cartridge 34 is of a desired type, then the assembled cartridge 34 is carried from the intermediate position 332 and inserted into the case 38 on the index table 326 by the cartridge loading unit 328.

As shown in FIG. 16, the case 38 with the assembled cartridge 34 inserted therein is intermittently rotated with the index table 326 in the direction indicated by the arrow, toward the cartridge detecting station ST4b. In the cartridge detecting station ST4b, as shown in FIG. 18, the light-emitting element 368 of the transmissive photosensor 366 emits light obliquely downwardly. The light passes through the case 38, but is blocked by the assembled cartridge 34. Therefore, if no assembled cartridge 34 is placed in the case 38, the light is applied to the light-detecting element 370, which generates an ON signal.

The case 38 with the assembled cartridge 34 inserted therein is then transferred from the cartridge detecting station ST4b to the case cap inserting station ST5b. In the case cap inserting station ST5b, a case cap 40 is inserted into the open end of the cap 38, producing a packaged product 12. At this time, the case cap detector 372 is energized to detect whether the case cap 40 is securely mounted on the open end of the case 38 or not.

As shown in FIG. 19, when the suction cup 382 is lowered to attract the case cap 40, the height of the suction shaft 380 is detected by the photosensors 386a, 386b and the dogs 384a, 384b to decide whether the case cap 40 is properly mounted or not.

Then, if the packaged product 12 is judged as accepted, the packaged product 12 is transferred from the normal packaged product discharging station ST7b to the intermediate placement area 340, and then delivered to the conveyor 62. A sample product 12a is delivered to the sample product chute 342. If the packaged product 12 is judged as defected according to the various inspection processes, then the packaged product 12 is delivered to the defective packaged product discharging station ST8b where it is discharged into the discharge chute 344.

The assembled cartridge 34 may not be inserted into the case 38 in the encasing unit 42, but may be accumulated in the semifinished product accumulating unit 64 by the conveyor 62.

As shown in FIG. 20, a plurality of spools 20 are filled in the hopper 388 in the spool supply unit 50. A predetermined number of spools 20 are supplied from the hopper 388 to the bucket 392, which is then lifted along the parts lifter 390 to supply the spools 20 to the aligning feeder 394. The aligning feeder 394 is actuated to deliver the spools 20 successively onto the conveyor 402.

As shown in FIGS. 20 and 21, the spools 20 are delivered into the tube 403 of the conveyor 402 and transferred through the tube 403 in the direction indicated by the arrow E by the air blower (not shown), onto the belt conveyor 405. The spools 20 are then successively fed, with their axes oriented in the direction indicated by the arrow E, toward the spool introducing mechanism 406 by the belt conveyor 405. In the spool introducing mechanism 406, when a spool 20 is introduced into the transfer base 428, the transfer base 428 with the spool 20 supported therein is moved in the direction indicated by the arrow G by the first actuator 426.

Specifically, as shown in FIGS. 22 and 23, the first motor 440 of the first actuator 426 is energized to cause the belt and pulley mechanism 442 operatively coupled to the rotatable shaft 440a to rotate the rotatable shaft 444, thereby rotating the cam 446 in unison with the rotatable shaft 444. The swing cam 448 held in rolling contact with the cam 446 angularly moves the arm 450 in the direction indicated by the arrow G, whereupon the cam follower 436 is subjected to only a tension applied by the tension spring 438. The rod 430 on which the cam follower 436 is mounted is now displaced in unison with the transfer base 428 in the direction indicated by the arrow G, while being guided by the support 434.

Upon further rotation of the cam 446, the arm 450 swings in the direction opposite to the direction indicated by the arrow G, pressing the cam follower 436 in the direction indicated by the arrow G against the tension imposed by the tension spring 448. Therefore, the transfer base 428 is placed back into alignment with the belt conveyor 405, and receives a spool 20 delivered by the belt conveyor 405. The spool 20 is held by the transfer base 428 with the large-diameter flange 398a or 398b held against the holder plate 429, as shown in FIG. 24.

The spool 20 which has been transferred to the position above the tube 440 by the spool introducing mechanism 406 is oriented with its shorter end 396b facing downwardly (forwardly), by the spool orienting mechanism 408, and falls through the tube 404 into the inspecting station 410. Specifically, as shown in FIG. 25, when the spool 20 is transferred to the position above the tube 440, the longer end 396a of the spool 20 is supported on the support base 452b, and the shorter end 396b of the spool 20 is spaced from the support base 452a. Therefore, the spool 20 starts being tilted with the shorter end 396b oriented downwardly into the opening 456, and then falls with the shorter 396b facing downwardly through the tube 404 into the inspecting station 410.

In the inspecting station 410, the U-shaped upper support plate 480 of the second support unit 466 of the holder mechanism 412 projects into the block 460, and supports the spool 20 with its U-shaped distal end. The lower support plate 478 of the first support unit 464 is positioned out of the block 430.

As shown in FIG. 23, when the second motor 470 of the second actuator 468 is energized, the rotatable shaft 472 is rotated in unison with the drive shaft 470a, the first cam unit 474 moves the lower support plate 478 in one of the directions indicated by the arrow C into the block 460. The upper support plate 480 is displaced out of the block 460 by the second cam unit 476, whereupon the spool 20 falls from the upper support plate 480 onto the lower support plate 478 (see FIG. 26).

Then, air is injected from the air nozzle 416 into the space 414 defined between the large-diameter flanges 398a, 398b of the spool 20 and the inner wall surface 404a of the tube 404. The pressure sensor 418 mounted on the block 460 detects an air pressure in the space 414, and transmits the detected air pressure to the computer 570. The computer 570 decides whether the detected air pressure falls in a predetermined reference range or not.

Specifically, if the large-diameter flanges 398a, 398b of the spool 20 suffer a defect, then air leaks from the space 414 through the defect, and the air pressure detected by the pressure sensor 418 becomes lower than the reference range, whereupon the computer 570 judges the spool 20 as defective. More specifically, the diameter $d_1$ of the large-diameter flanges 398a, 398b is set to 21.80±0.15 mm, the inside diameter $d_2$ of the inner wall surface 404a of the tube 404 is set to the range from 22.15 mm to 22.55 mm. The pressure of the air ejected from the air nozzle 416 is set to 0.01 (kgf/cm$^2$G). Consequently, the difference between the air pressure detected by the pressure sensor 418 when a normal spool 20 is inspected and the air pressure detected by the pressure sensor 418 when a spool 20 with a defective large-diameter flange 398a or 398b is inspected is large enough to inspect spools 20 reliably with the accuracy of the resolution of the pressure sensor 418.

If the inspected spool 20 is judged as normal, then the spool 20 is supplied from the first tube 492 of the feed path switching mechanism 424 into the first feed path 420. The normal spool 20 is then fed through the first feed path 420 to the film coiling unit 22.

If the inspected spool 20 is judged as defective, then, as shown in FIG. 28, the cylinder 500 of the feed path switching mechanism 424 is operated to move the rod 502 in the direction indicated by the arrow B. The arm 498 is angularly moved about the shaft 496 in the direction indicated by the arrow B, so that the first and second tubes 492, 494 mounted on the shaft 496 are turned in the direction indicated by the arrow M. The second tube 494 is positioned at the outlet of the block 460, and guides the defective spool 20 from the block 460 into the second feed path 422, from which the defective spool 20 is sent to the discharging position (not shown).

As shown in FIG. 29, a plurality of cases 38 are filled in the hopper 508 in the case supply unit 56. A predetermined number of cases 38 are supplied from the hopper 508 to the bucket 512, which is then lifted along the parts lifter 510 to supply the cases 38 to the aligning feeder 514. The aligning feeder 514 is actuated to deliver the cases 38 successively onto the feed path 516, from which the cases 38 are delivered to the discharging device 515 (see also FIG. 30).

In the discharging device 515, as shown in FIGS. 31 and 32, the passage member 530 is disposed in the feed position P1. A case 38 delivered through the first tube 554 in the direction indicated by the arrow K is introduced into the through hole 528 in the passage member 530, and thereafter delivered from the second tube 556 into the feed path 516. The through hole 528 includes the deformed case engaging surface 534 tapered in the direction indicated by the arrow K. The diameter $d_2$ of the exist region of the deformed case engaging surface 534 is slightly greater than the outside diameter of the cases 38. Specifically, diameter $d_2$ of the exist region of the deformed case engaging surface 534 is 31.9 mm, and the outside diameter of the cases 38 is 31 mm.

Therefore, when an undeformed normal case 38 is introduced into the through hole 528, the normal case 38 is delivered to the second tube 556 without being trapped in the through hole 528. Therefore, the photosensors 526a, 526b are turned on and off within a given period of time.

When a deformed case 38a is introduced into the through hole 528, the deformed case 38a is engaged and trapped by the deformed case engaging surface 534. The photosensors 526a, 526b are turned off for more than the given period of time, thus detecting that the deformed case 38a remains in the passage member 530. The removing mechanism 520 is operated to displace the passage member 530 with the deformed case 38a trapped therein to the removal position P2 (see FIG. 33).

Specifically, the cylinder 542 of the displacing unit 532 is actuated to move the movable base 540 along the guide rails 538 in one of the directions indicated by the arrow L for displacing the passage member 530 in unison with the movable base 540 from the feed position P1 to the removal position P2. Then, the cylinder 548 of the transfer mechanism 522 is operated to move the pusher rod 550 in the direction indicated by the arrow K, and air is ejected from the air passageway 552 defined axially in the pusher rod 550.

The deformed case 38a trapped in the through hole 528 is now reliably pushed out of the passage member 530 into the discharge tube 546 by the pusher rod 550 and the air ejected from the air passageway 552, and then automatically discharged from the discharge tube 546 into the discharging unit.

As shown in FIG. 17, the normal case 38 is delivered to the index table 326 of the encasing unit 42 by the pusher 354. At this time, the fiber sensor 356 of the case detector 346 is energized to detect the case 38. The fiber sensor 360 of the case inversion detector 348 is energized to detect whether the case 38 is inverted, i.e., whether the bottom 38a faces upwardly or not. The color sensor 362 of the color difference detector 350 detects whether the case 38 is of a desired color or not.

If the case 38 is not detected by the case detector 346, then the information indicating that the case 38 is not detected is sent to the various stations. A case 38 which has been judged as defective is discharged from the discharge chute 344, with no assembled cartridge 34 inserted therein.

In the film producing and packaging system 10, various defective products produced after an elongate film F is unwound from a film roll 14 until packaged products 12 are manufactured are individually discharged without being processed in subsequent processes. Specifically, a support film base is coated with a photosensitive layer to produce a blank film before a film roll is produced from the blank film and processed by the film producing and packaging system 10. Information about defective regions on the blank film which are caused by the process of applying the photosensitive layer is stored in the computer 570.

When a defective region of the film roll 14 unwound by the feeder 70 is fed to the cutter 80 and a leading end of the defective region is cut by the cutter 80, the openable and closable guide 124 is displaced away from the film feed path, and the discharge receptacle 136 of the defective film discharger 43a is moved over the film feed path. Then, when the air blower 146 (FIG. 6) is actuated, a defective film Fa is attracted by the discharge receptacle 136 with the entire length of the defective region being continuously attracted, and the trailing end of the defective region is cut off by the cutter 80. The defective film Fa is now drawn through the discharge chute 138 into the accumulation chamber 142 in the discharge box 140.

When another defective region of the elongate film F, e.g., a joint between new and old elongate films F, is fed to the cutter 80, the defective region is drawn through the discharge chute 138 into the accumulation chamber 142 in the same manner as described above.

In the film coiling unit 22, the sized film 16 may not sufficiently be wound on the spool 20, resulting in a defective film coil 32a. When such a defective film coil 32a is produced, as shown in FIG. 10, the defective film coil 32a is discharged into the discharge chute 204 of the defective film roll discharger 43b positioned near the second transfer unit 190. Therefore, the defective film coil 32a will not be fed to the index table 202 of the assembling unit 36.

The cap height and torque detecting station ST9a on the index table 202 detects the resistance to the pulling of the trailing end 16c of the sized film 16 that projects from the assembled cartridge 34, detects the height of the assembled cartridge 34, detects the length of the trailing end 16c, and detects whether there is a cap 26b or not. When an assembled cartridge 34a judged as defective based on the detected results is fed to the second feed path 48, since the cartridge loading unit 328 is not operated, the defective assembled cartridge 34a is discharged into the discharge chute 324 of the defective cartridge discharger 43c. Accordingly, the defective assembled cartridge 34a will not be delivered to the encasing unit 42.

In the encasing unit 42, an assembled cartridge 34 may not be reliably loaded into a case 38. When this happens, no case cap 40 is mounted on a defective case 38a in the case cap inserting station ST5b, and the defective case 38a is delivered to the defective packaged product discharging station ST8b. Then, the defective case 38a with the assembled cartridge 34 accommodated therein is discharged into the discharge chute 344 of the defective case discharger 43d, and will not be delivered to the conveyor 62.

In this embodiment, the steps of detecting whether an elongate film F is defective or not, detecting whether a spool 20 is defective or not, and detecting whether an assembled cartridge 34 is defective or not are carried out. Therefore, various defective products can be detected after an elongate film F is unwound from a film roll 14 until packaged products 12 are manufactured, and will not be processed in subsequent processes. It is thus possible to produce high-quality packaged products 12 efficiently, and the rate of defective packaged products 12 is greatly reduced.

Specifically, the film supply unit 18 has the light emission detector 115, the light emission detector 117, the film position detector 150, the full length detector 152, and the splicing detector 154. The film position detector 150 can detect whether perforations 74 are positionally displaced or not to prevent the end face 159 of the sized film 16 from lying over perforations 74. If perforations 74 are positionally displaced, then a film feed system makes positional adjustments to correct the perforations 74 out of the positional displacement. The full length detector 152 ensures that a sized film 16 is cut to a desired length, and the splicing detector 154 functions to prevent a splicing tape 86 from existing in a sized film 16.

The film coiling unit 22 has the winding length abnormality detector 185. The assembling unit 36 has the tongue detector 218, the cap detector 230, the height detector 232, the torque detector 234, and the tongue length detecting unit (not shown). These detectors serve to reliably detect various defective products for the purpose of discharging them, so that defect-free high-quality assembled cartridges 34 can easily be produced.

The encasing unit 42 has the case detector 346, the case inversion detector 348, the color difference detector 350, the bar-code reading unit 334, and the detecting unit for detecting whether there is an assembled cartridge or not. Therefore, it is possible to manufacture high-quality packaged products efficiently.

In this embodiment, since various defective products are individually discharged without being processed in subsequent processes, these defective products are prevented from being delivered to subsequent processes and hence from being undesirably processed. Accordingly, high-quality packaged products can be manufactured efficiently, the rate of defective parts of packaged products can effectively be lowered.

A defective film coil 32a is not fed to the index table 202 of the assembling unit 36. Therefore, the probability that a defective assembled cartridge 34a will be manufactured is greatly reduced, and the number of discarded defective assembled cartridges 34a produced from the cartridge blank sheet 24 that is relatively expensive is lowered, resulting in a highly economical film producing and packaging process.

In the film producing and packaging system 10 according to the above embodiment, a predetermined number of sample products 12a for each film roll 14 are periodically extracted. Furthermore, if it is necessary to extract a sample product 12a because of a failure or maintenance of the film producing and packaging system 10, then the computer 570 instructs the film producing and packaging system 10 to extract a sample product 12a.

The operator may operate the control console 66 to extract a sample product 12a from each of certain blocks. These blocks may comprise the film supply unit 18, the film coiling unit 22, and the assembling unit 36, or may comprise smaller components including the turntable 172, the first transfer unit 188, and the second transfer unit 190. The operator may designate a sized film 16 existing in either one of these blocks to remove a packaged product 12 which contains the designated sized film 16 as a sample product 12a, and place the sample product 12a into the sample product accumulating unit 341.

Accordingly, it is possible to extract any desired packaged product 12 easily and reliably as a sample product 12a, for inspecting how defective a sized film 16 recognized as a defective film is, for example.

Furthermore, spools 20 fed by the belt conveyor 405 in the direction indicated by the arrow E are delivered one at a time by the spool introducing mechanism 406, and dropped into the tube 404 with the shorter end 396b facing downwardly (forwardly) by the spool orienting mechanism 408.

Then, while the spool 20 is being held in the inspecting station 410 by the holder mechanism 412, air is introduced into the space 414 defined between the large-diameter flanges 398a, 398b of the spool 20 and the inner wall surface 404a of the tube 404, and the air pressure in the space 414 is detected by the pressure sensor 418 to detect whether the large-diameter flanges 398a, 398b are defective or not.

Therefore, each of the spools 20 that are successively fed from the spool supply unit 50 can quickly and accurately be inspected for defects, making it possible to prevent defective spools 20 from being delivered to the film coiling unit 22 and hence to prevent defective packaged products 14 from being manufactured. Consequently, the rate of defective packaged products 14 is effectively reduced.

In this embodiment, moreover, a spool 20 judged as accepted in the inspecting station 410 is delivered from the first tube 492 through the first feed path 420 to the film coiling unit 22, and a spool 20 judged as defective in the inspecting station 410 is automatically discharged from the second tube 494, which is positioned below the block 460 by the feed path switching mechanism 424, through the second feed path 422 to the discharging position. Therefore, defective spools 20 are automatically discharged, and the discharging process is made efficient.

In the above embodiment, a spool 20 fed in the direction indicated by the arrow G by the spool introducing mechanism 406 is automatically oriented by the spool orienting mechanism 408 such that one end, e.g., the shorter end 396b, faces downwardly at all times. Therefore, spools 20 successively delivered by the aligning feeder 394 are not required to be oriented beforehand in one direction, and hence the spools 20 can be fed smoothly and efficiently.

Furthermore, when a case 38 supplied from the case supply unit 56 is delivered to the detecting station ST in the feed path 516 extending from the case supply unit 56 to the encasing unit 42, it is detected whether the case 38 remains trapped in the detecting station ST for more than a predetermined period of time or not for thereby deciding whether the case 38 is a deformed case 38a or not.

If the case 38 is judged as an undeformed case 38, then it is fed through the through hole 528 in the passage member 530 and delivered from the second tube 556 to the encasing unit 42. If the case 38 is judged as a deformed case 38a, then it is displaced, together with the passage member 530 to the removal position P2, from which the deformed case 38a is automatically delivered into the discharge tube 546 by the transfer mechanism 522.

Therefore, the encasing unit 42 is supplied with only undeformed normal cases 38. Even if a normal case 38 is deformed into a deformed case 38a among many cases 38 in the case supply unit 56, the deformed case 38a is reliably picked up from the feed path 516 at the detecting station ST, and will not be delivered to the encasing unit 42.

Accordingly, only undeformed normal cases 38 are fed to the encasing unit 42, so that the rate of defective packaged products 14 is effectively lowered. The discharging device 515 is effectively simplified in structure, and the process of delivering a deformed case 38a to the discharge tube 546 after the deformed case 38a has been detected in the feed path 516 is automatized.

With the film producing and packaging system according to the present invention, as described above, the steps of detecting whether a photographic photosensitive film is defective or not, detecting whether a spool is defective or not, and detecting whether an assembled cartridge is defective or not, and detecting whether a case is defective or not are carried out until packaged products are produced from a film roll. Therefore, various defective products will not be delivered to and processed in subsequent processes. Such a defective product can be extracted when it is detected or immediately before reaching a subsequent process. It is thus possible to produce high-quality packaged products efficiently, and the rate of defective packaged products is greatly reduced.

Various defective products produced after an elongate film is unwound from a film roll until packaged products are manufactured are individually discharged without being processed in subsequent processes. Therefore, the various defective products will not undesirably be processed in subsequent processes. Thus, it is possible to produce high-quality packaged products efficiently, and effectively lower the rate of defective parts of the packaged products.

While a part being fed in the tube is held in the inspecting position, an inspecting fluid is introduced into the space defined between the large-diameter portions of the part and the inner wall surface of the tube, and the fluid pressure in the space is detected to inspect the large-diameter portions for a defect. The part can thus be inspected for a defect quickly and accurately, and hence the rate of defects can effectively be lowered.

Furthermore, when a part remains trapped in the inspecting position in the feed path for more than a predetermined period of time, the part is judged as being deformed, and is automatically removed from the feed path. Therefore, the deformed part can automatically and reliably be removed from the feed path, and only normal parts can reliably and smoothly be delivered to subsequent processes, so that the rate of defects can effectively be lowered.

Although a certain preferred embodiment of the present invention has been shown and described in detail, it should be understood that various changes and modifications may be made therein without departing from the scope of the appended claims.

What is claimed is:

1. A method of processing and packaging a photographic film, comprising the steps of:

coiling a sized film cut to a predetermined length around a spool thereby to produce a film coil;

inserting said film coil into a single-open-ended cartridge thereby to produce an assembled cartridge;

placing said assembled cartridge into a case thereby to produce a packaged product;

detecting whether a part supplied from a part supply unit through a feed path remains in a detecting station in said feed path for more than a predetermined period of time;

if said part remains in said detecting station for more than said predetermined period of time, then automatically removing said part as a deformed part from said feed path; and delivering the removed deformed part to a discharging unit.

2. A method according to claim 1, wherein said part comprises said case.

3. A system for processing and packaging a photographic film, comprising:

a film coiling unit for coiling a sized film cut to a predetermined length around a spool thereby to produce a film coil;

an assembling unit for inserting said film coil into a single-open-ended cartridge thereby to produce an assembled cartridge;

an encasing unit for placing said assembled cartridge into a case thereby to produce a packaged product;

a detecting station disposed in a feed path for supplying part from a part supply unit;

a detecting mechanism for detecting whether said part remains in said detecting station for more than a predetermined period of time;

a removing mechanism for automatically removing said part as a deformed part from said feed path to a removal position if said part remains in said detecting station for more than said predetermined period of time; and a delivery mechanism for delivering the removed deformed part to a discharging unit.

4. A system according to claim 3, wherein said removing mechanism comprises:

a passage member having a through hole defined therein as part of said feed path; and displacing means for displacing said passage member into and out of said feed path;

said through hole including a deformed case engaging surface at a position aligned with said detecting mechanism, said deformed case engaging surface being tapered in a direction in which said part is fed along said feed path.

5. A system according to claim 3, wherein said delivery mechanism comprises:

pressing means disposed in said removal position for pressing said deformed part from said removing mechanism; and a discharge tube for guiding said deformed part pressed from said removing mechanism toward said discharging unit.

6. A system according to claim 5, wherein said pressing means comprises:

an actuator;

a pusher rod movable by said actuator for engaging said deformed part; and an air passageway defined in said pusher rod for ejecting air toward said deformed part.

7. A system according to claim 3, wherein said detecting mechanism comprises a photosensor for detecting whether there is a part in said detecting station.

* * * * *